US009313585B2

(12) United States Patent
Lunner

(10) Patent No.: US 9,313,585 B2
(45) Date of Patent: Apr. 12, 2016

(54) METHOD OF OPERATING A HEARING INSTRUMENT BASED ON AN ESTIMATION OF PRESENT COGNITIVE LOAD OF A USER AND A HEARING AID SYSTEM

(75) Inventor: Thomas Lunner, Smorum (DK)

(73) Assignee: OTICON A/S, Smørum (DK)

( * ) Notice: Subject to any disclaimer, the term of this patent is extended or adjusted under 35 U.S.C. 154(b) by 964 days.

(21) Appl. No.: 12/642,345

(22) Filed: Dec. 18, 2009

(65) Prior Publication Data

US 2010/0196861 A1 Aug. 5, 2010

Related U.S. Application Data

(63) Continuation of application No. PCT/EP2008/068139, filed on Dec. 22, 2008.

(60) Provisional application No. 61/171,372, filed on Apr. 21, 2009.

(51) Int. Cl.
*G09B 21/00* (2006.01)
*H04R 25/00* (2006.01)

(52) U.S. Cl.
CPC .............. *H04R 25/505* (2013.01); *H04R 25/43* (2013.01); *H04R 2225/61* (2013.01); *H04R 2225/81* (2013.01)

(58) Field of Classification Search
USPC .......................................................... 434/112
See application file for complete search history.

(56) References Cited

U.S. PATENT DOCUMENTS 5,176,133 A * 1/1993 Czeisler et al. ................ 607/88
5,721,783 A 2/1998 Anderson
6,146,147 A 11/2000 Wasowicz
6,330,339 B1 * 12/2001 Ishige et al. .................. 381/312
6,435,878 B1 8/2002 Reynolds et al.
6,574,513 B1 6/2003 Collura et al.

(Continued)

FOREIGN PATENT DOCUMENTS

WO WO 02/33673 A2 4/2002
WO WO/03030586 4/2003

OTHER PUBLICATIONS

European Search Report issued Mar. 2, 2011 in corresponding EP 09179811.6-2225 / 2200347.

(Continued)

*Primary Examiner* — Timothy Musselman
*Assistant Examiner* — Evan Page
(74) *Attorney, Agent, or Firm* — Buchanan Ingersoll & Rooney P.C.

(57) ABSTRACT

A method of operating a hearing instrument for processing an input sound and to provide an output stimulus according to a user's particular needs, and related system, computer readable medium and data processing system. An object is to provide an improved customization of a hearing instrument. The method includes the steps a) providing an estimate of the present cognitive load of the user; b) providing processing of an input signal originating from the input sound according to a user's particular needs; and c) adapting the processing in dependence of the estimate the present cognitive load of the user. The estimate of the present cognitive load of a user is produced by in-situ direct measures of cognitive load (e.g. based on EEG-measurements, body temperature, etc.) or by an on-line cognitive model in the hearing aid system whose parameters have been preferably adjusted to fit to the individual user.

16 Claims, 6 Drawing Sheets

(56) References Cited

U.S. PATENT DOCUMENTS

| | | | | |
|---|---|---|---|---|
| 7,226,164 | B2 * | 6/2007 | Abourizk et al. | 351/206 |
| 2004/0264719 | A1 | 12/2004 | Naylor | |
| 2005/0129262 | A1 * | 6/2005 | Dillon et al. | 381/312 |
| 2005/0287501 | A1 * | 12/2005 | Sweetow et al. | 434/169 |
| 2006/0093997 | A1 | 5/2006 | Kearby et al. | |
| 2006/0215860 | A1 * | 9/2006 | Wyrsch | 381/312 |
| 2006/0216860 | A1 | 9/2006 | Wyrsch | |
| 2007/0038436 | A1 | 2/2007 | Cristo et al. | |
| 2007/0112277 | A1 * | 5/2007 | Fischer et al. | 600/544 |
| 2007/0173699 | A1 * | 7/2007 | Mathan et al. | 600/300 |
| 2007/0237346 | A1 | 10/2007 | Fichtl et al. | |

OTHER PUBLICATIONS

P. Barrouillet et al., "Time and Cognitive Load in Working Memory" *Journal of Experimental Psychology: Learning, Memory, and Cognition*, (2007) vol. 33, No. 3, 570-585, American Psychological Association.
PCT Written Opinion and Search Report issued Aug. 27, 2009 in corresponding PCT/EP208/068139.
Edwards B. "The Future of Hearing Aid Technology," *Trends in Amplification*, vol. 11, No. 1 (2007) pp. 31-46.
Engle Randall W. et al. "Individual Differences in Working Memory Capacity and What They Tell Us About Controlled Attention, General Fluid Intelligence, and Functions of the Prefrontal Cortex" In A. Myake & P. Shah (Eds.), *Models of Working Memory* (1999) pp. 102-134, Cambridge (CUP).
Foo C. et al. "Recognition of Speech in Noise with New Hearing Instrument Compression Release Settings Requires Explicit Cognitive Storage and Processing Capacity," *J. Am. Acad. Audiol.*, vol. 18 (2007) pp. 618-631.
Gevins, A. et al. "High Resolution EEG Mapping of Cortical Activation Related to Working Memory: Effects of Task Difficulty, Type of Processing, and Practice" *Cerebral Cortex*, vol. 7(4), (1997) pp. 374-385.
Lan et al. "Channel Selection and Feature Projection for Cognitive Load Estimation Using Ambulatory EEG" *Computational Intelligence and Neuroscience*, vol. 2007 (2007), Article ID 74895, 12 pages.
Li, K.Z.H. et al. "Walking While Memorizing: Age-Related Differences in Compensatory Behavior" *Psychol. Sci.*, vol. 12 (3), (2001) pp. 230-237, American Psychological Society.
Lunner T. "Cognitive Function in Relation to Hearing Aid Use" *Int. J. Audiol.*, vol. 42 (Suppl. 1), (2003) pp. S49-S58.
Lunner T. et al. "Interactions Between Cognition, Compression, and Listening Conditions: Effects on Speech-in-Noise Performance in a Two-Channel Hearing Aid," *J. Am. Acad. Audiol.*, vol. 18, (2007) pp. 604-617.
Naylor G. et al. "Fast-Acting Compressors Change the Effective Signal-to-Noise Ratio—Both Upwards and Downwards" *International Hearing Aid Research Conference* (IHCON), Lake Tahoe, CA, (2006).
Naylor, G. "Long-Term Signal-to Noise Ratio at the Input and Output of Amplitude-Compression Systems" *J. Am. Acad. Audiol.* vol. 20 (3) (2009) pp. 161-171.
Pichora-Fuller, M.K. "Audition and Cognition: What Audiologists Need to Know About Listening" In C. Palmer & R. Seewald (eds.) *Hearing Care for Adults* Stäfa, Switzerland: Phonak, (2007) pp. 71-85.
Rönnberg J. "Cognition in the Hearing Impaired and Deaf as a Bridge Between Signal and Dialogue: A Framework and a Model" *Int. J. Audiol.*, vol. 42, (2003) pp. S68-S76.
Rönnberg, J. et al. "Cognition Counts: A Working Memory System for Ease of Language Understanding (ELU)" *International Journal of Audiology*, vol. 47 (Suppl. 2), (2008) pp. S99-S105.
Sarampalis A. et al. "Objective Measures of Listening Effort: Effects of Background Noise and Noise Reduction" *Journal of Speech, Language, and Hearing Research*, vol. 52, (Oct. 2009), pp. 1230-1240.
Sarampalis A. et al. "Cognitive Effects of Noise Reduction Strategies" *International Hearing Aid Research Conference* (IHCON), Lake Tahoe, CA Aug. 2006.
Extended European Search Report dated Apr. 20, 2015, issued by the European Patent Office in the corresponding European Application No. 15156156.0. (5 pages).

* cited by examiner

METHOD OF OPERATING A HEARING INSTRUMENT BASED ON AN ESTIMATION OF PRESENT COGNITIVE LOAD OF A USER AND A HEARING AID SYSTEM

CROSS-REFERENCE TO RELATED APPLICATIONS

This application is a utility application claiming benefit under 35 USC 119(e) to provisional application Ser. No. 61/171,372, filed Apr. 21, 2009, and this application is a continuation of, claiming priority under 35 USC 120, PCT/EP2008/0068139, filed Dec. 22, 2008.

TECHNICAL FIELD

The present application relates to hearing aids in particular to customization of hearing aids to a user's specific needs. The application relates specifically to a method of operating a hearing instrument for processing an input sound and to provide an output stimulus according to a user's particular needs.

The application furthermore relates to a hearing aid system for processing an input sound and to provide an output stimulus according to a user's particular needs.

The application furthermore relates to a tangible computer-readable medium storing a computer program, and to a data processing system.

The disclosure may e.g. be useful in applications where a hearing impaired user's current mental resources are challenged.

BACKGROUND ART

The background of the application is described in two parts:

1. Effects of working memory and cognitive load in difficult listening situations is reviewed
2. Hearing aid signal processing that may improve/ameliorate cognitive load is Reviewed 1. Effects of Working Memory and Cognitive Load in Difficult Listening Situations In an optimum listening situation, the speech signal is processed effortlessly and automatically. This means that the cognitive processing involved is largely unconscious and implicit. However, listening conditions are often suboptimum, which means that implicit cognitive processes may be insufficient to unlock the meaning in the speech stream. Resolving ambiguities among previous speech elements and constructing expectations of prospective exchanges in the dialogue are examples of the complex processes that may arise. These processes are effortful and conscious and thus involve explicit cognitive processing.

Working memory (WM) capacity is relatively constant but varies between individuals (Engle et al., 1999). In performing dual tasks which tax the working memory, there are large individual differences in the ability to assign cognitive resources to both tasks (Li et al., 2001). It has yet to be investigated how persons with HI allocate their cognitive resources to different aspects of the language understanding process and how much cognitive spare capacity (CSC) remains to be devoted to other tasks once successful listening has been accomplished.

The ELU (Rönnberg, 2003; Rönnberg, Rudner, Foo & Lunner, 2008) relies on the quality of phonological representations in long-term memory, lexical access speed, and explicit storage and processing capacity in working memory. When phonological information extracted from the speech signal can be matched rapidly and smoothly in working memory to phonological representations in long term memory, cognitive processing is implicit and ELU is high. The ELU framework predicts that when mismatch occurs in a communicative situation, it not only elicits a measurable physiological response, it also leads to an engagement of explicit cognitive processes, such as comparison, manipulation and inference making. These processes engage explicit processing and short-term storage capacity in working memory, which can be termed complex working memory capacity. Thus, individual complex working memory capacity is crucial for compensating mismatch.

Listening situations with various background noises or reverberation makes the (speech) signal suboptimal and influence speech recognition both for normal hearing persons and hearing impaired persons but to different extent.

Results by Lunner and Sundewall-Thorén (2007) suggests that in an aided condition with slow-acting compression and unmodulated noise the test subjects' cognitive capacities are active, but without exceeding the capacity limit of most hearing impaired individual listeners. Thus, the individual peripheral hearing loss restrains the performance and the performance may be explained by audibility. Possession of greater cognitive capacity confers relatively little benefit. However, in the complex situation with fast-acting compression and varying background noise, much more cognitive capacity is required for successful listening. Thus, the individual cognitive capacity restrains the performance and the speech-in-noise performance may, at least partly, be explained from individual working memory capacity.

Furthermore, Sarampralis et al. (2008) have shown that the about 4 dB SNR improvement (attenuation of spatially separated disturbing sources) of directional microphones (in comparison to omnidirectional microphones) have implications for improved memory (recall) and faster response times. Sarampralis et al. (2008) have also shown positive results on memory (recall) and response times for noise reduction systems.

A hearing impairment will restrict the amount of information transferred to the brain as well the signal information being of poorer quality compared to normal hearing people because of the perceptual consequences of the cochlear damage, such as reduced time and frequency resolution, difficulties to utilize temporal fine-structure, worse ability for grouping of sound streams as well as worse abilities to segregate sound streams. Thus, for the hearing impaired more situations will provoke effortful explicit processing. For example, hearing impaired are more susceptible to reverberation, background noises, especially fluctuation noises or other talkers, as well as have worse abilities for spatial separation than normal hearing persons.

2. Hearing Aid Signal Processing that May Improve/Ameliorate Cognitive Load

Hearing aids have several purposes; first of all they compensate the reduced sensitivity for weak sounds as well as the abnormal growth of loudness through the use of multi-channel compression amplification systems, with either fast or slow time constants (Fast-acting compression can actually be seen as a noise-reduction system under certain conditions, see e.g. Naylor et al. (2006). In addition there are 'helping systems' that may reduce cognitive load that are used in certain situations to improve speech recognition in noise and under other circumstances to increase comfort when speech not is present. Edwards et al. (2007) have shown that directional microphones and noise reduction systems increase memory and reduce response times compared to the unprocessed cases, i.e. indications on less cognitive load. The main components of such helping systems are directional microphones and noise reduction systems. The helping systems are usually automatically invoked based on information from detectors, such as speech/no-speech detectors, signal-to-noise ratio detectors, front/back detectors, and level detectors. The underlying assumption is that the detectors can help to distinguish between 'easier' listening situations and more 'difficult'/demanding situations. This information is used to automate the switching in-and out of the helping systems to help the user to have a comfortable monitoring sound processing when speech is not present to a more aggressive directional microphone set-up and noise reduction system when being in a demanding communication situation.

The 'helping systems' are only used in certain listening situations because they give benefit in only these situations, in other situations they may actually be contra-productive, for example invoking directional microphones, which attenuates sounds from other directions than the frontal direction, in a situation where there are little background noise and/or where information from behind are of importance, the directional microphones may actually worsen for example localization and probably be more effortful than a omni-directional microphone. Thus, the directional system may negatively influence naturalness, orientation abilities, and object formation, localization abilities.

Similar drawbacks are present for noise reduction systems.

U.S. Pat. No. 6,330,339 describes a hearing aid comprising means for detecting a condition of a wearer (biological information, motion) and means for determining a mode of operation of the hearing aid based on a predetermined algorithm. The condition detecting means use outputs of a pulse sensor, a brain wave sensor, a conductivity sensor and an acceleration sensor, respectively. By this, the characteristics of the hearing aid can be varied adapting to the wearer's condition.

DISCLOSURE OF INVENTION

The decision to invoke such helping systems may be dependent on the hearing aid user's cognitive status. An estimate of a user's cognitive status or cognitive load can e.g. be based on an estimate of the user's working memory capacity. For example the correlation between working memory (WM) performance and speech reception threshold (SRT) in noise, as shown in Lunner (2003) and Foo et al. (2007), indicates that people with high WM capacity are more noise tolerant than people with low WM capacity. This indicates that people with high WM should probably not have the same (SNR) threshold, e.g. when the directional microphone systems or noise reduction systems become active.

Furthermore, what is a demanding situation for one person can be an 'easy' situation for another person depending on their working memory capacity.

And, this is the main point here, when the situation becomes highly dependent on (individual) explicit processing there would probably be a need to switch to the helping systems to be able to manage the situation.

Furthermore, in the future we will see even more aggressive noise reduction systems such as time-frequency masking (Wang et al., 2008) or speech enhancement systems (e.g. Hendriks et al., 2005) as well as aggressive directional systems that are very helpful in certain situations while contra-productive in other situations. Therefore, there will be a need to individually determine when and under which circumstances to shift to the helping systems.

An object of the present application is to provide an improved customization of a hearing instrument.

Objects of the application are achieved by the invention described in the accompanying claims and as described in the following.

A Method

An object of the application is achieved by a method of operating a hearing instrument for processing an input sound and to provide an output stimulus according to a user's particular needs. The method comprises a) providing an estimate of the present cognitive load of the user;

b) providing processing of an input signal originating from the input sound according to a user's particular needs, c) adapting the processing in dependence of the estimate the present cognitive load of the user.

This has the advantage that the functionality of the hearing aid system is adapted to the current mental state of the user.

The application solves the above problem by utilising direct measures of cognitive load or estimations of cognitive load from an on-line cognitive model in the hearing aid whose parameters have been adjusted to fit to the individual user. When the direct measures of cognitive load indicate high load or that the cognitive model predicts that the cognitive limit of the current user have been exceeded, helping systems such as directional microphones, noise reduction schemes, time-frequency masking schemes are activated to reduce the cognitive load. The parameters in the helping systems are steered in accordance with the direct cognitive measure or the estimation from the cognitive model to reduce the cognitive load to a given residual cognitive spare capacity.

In an embodiment, a user's working memory capacity is estimated. In an embodiment, a user's working memory capacity is estimated prior to any use or normal operation of the hearing instrument. In an embodiment, the estimate of the user's working memory capacity is used in the estimate of the user's present cognitive load. In an embodiment, the present working memory span of the user is estimated in different situations, e.g. prior to any use or normal operation of the hearing instrument. In an embodiment, an estimate of the present cognitive load of a user is related to an estimate of the present working memory span of the user.

The term 'an estimate of present cognitive load' of a user is in the present context taken to mean an estimate of the present mental state of the user, the estimate at least being able to differentiate between two mental states HIGH and LOW use of mental resources (cognitive load). A LOW cognitive load is taken to imply a state of implicit processing of the current situation/information, which the user is exposed to (i.e. a routine situation, requiring no conscious mental activity). A HIGH cognitive load is taken to imply a state of explicit processing by the brain of the current situation/information, which the user is exposed to (i.e. a non-routine situation requiring mental activity). Acoustic situations requiring explicit processing of a user can e.g. be related to a bad signal to noise ratio (e.g. due to a noisy environment or a 'party'-situation) or to reverberation. In an embodiment, the estimate of present cognitive load comprises a number of load levels, e.g. 3 or 4 or 5 or more levels. In an embodiment, the estimate of present cognitive load is provided in real time, i.e. the estimate of present cognitive load is adapted to be responsive to changes in a user's cognitive load within seconds, e.g. in less than 10 s, e.g. less than 5 s, such as less than 1 s. In an embodiment, the estimate of present cognitive level is provided in as a result of a time-averaging process over a period, which is smaller than 5 minutes, such as smaller than 1 minute, such as smaller than 20 seconds.

In an embodiment, the method comprises providing a cognitive model of the human auditory system, the model providing a measure of the present cognitive load of the user based on inputs from customizable parameters, and providing said estimate of the present cognitive load of the user in dependence on said cognitive model.

In an embodiment, it is suggested to use an online individualized cognitive model in the hearing aid that determines when signal processing to reduce cognitive load should be used.

In an embodiment, the method comprises individualizing at least one of the customizable parameters of the cognitive model to a particular user's behavior.

One cognitive model that may be used is the Ease of Language Understanding model (Rönnberg, 2003; Rönnberg et al., 2008), which may predict when the cognitive load in a situation switch from implicit (effortless) to explicit (effortful). Thus the suggested use of the real-time ELU model would be to steer the aggressiveness of helping systems for the individual, in situations which are explicit/effortful for the individual. Other cognitive models may be used e.g. TRACE model (McClelland & Elman, 1986), the Cohort model (Marslen-Wilson, 1987) NAM model (Luce & Pisoni, 1998), the SOAR-model (Laird et al., 1987), the CLARION model (Sun, 2002; Sun, 2003; Sun et al., 2001; Sun et al., 2005; Sun et al., 2006), the CHREST model (Gobet et al., 2000; Gobet et al., 2001; Jones et al., 2007) and the ACT-R model (Reder et al., 2000; Stewart et al., 2007), as well as Working Memory models according to Baddeley (Baddeley, 2000), however, according to the needs of the particular application.

In an embodiment, the processing of an input signal originating from the input sound according to a user's particular needs comprises providing a multitude of separate functional helping options, one or more of said separate functional options being selected and included in the processing according to an individualized scheme, depending on the input signal and/or on values of signal parameters derived there from, and on said estimate of the present cognitive load of the user.

In an embodiment, the separate functional helping options are selected from the group comprising (see e.g. Dillon, 2001; or Kates, 2008):

- directional information schemes,
- compression schemes
- speech detecting schemes
- noise reduction schemes
- speech enhancement schemes,
- time-frequency masking scheme and combinations thereof.

This has the advantage that individual helping options can be taken into use or enhanced in dependence of an estimate of the cognitive load of a user, thereby increasing the comfort of the user and/or intelligibility of the processed sound.

The choice whether or not to invoke directional microphone is a trade-off between omni-directional and directional benefits. In a particular embodiment, a SNR (Signal to Noise Ratio) threshold at which the hearing aid automatically shifts from omni-directional to directional microphone is set for a particular user depending on the user's working memory capacity.

In a particular embodiment, a degree of noise reduction for a particular user in a particular listening situation is set depending on the user's working memory capacity. A person with a relatively high WM capacity is e.g. expected to be able to tolerate more distortions and thus more aggressive noise reduction than a person with a relatively low WM capacity in a given listening situation.

In a particular embodiment, the rate of compression for a particular user in a particular listening situation is set depending on the user's working memory capacity. A person with relatively high WM capacity with abilities to obtain a speech recognition threshold, SRT, in noise at negative SNR (see e.g. FIG. 6) would e.g. benefit from a relatively fast compression in that situation, while a person with a relatively low WM capacity, whose SRT in noise is at positive SNRs would have a disadvantage from fast compression.

In an embodiment, the properties or signal parameters extracted from the input signal include one or more of the following

- amount of reverberation,
- amount of fluctuation in background sounds,
- energetic vs. informational masking,
- spatial information of sound sources
- signal to noise ratio,
- richness of environmental variations and/or measures of auditory ecology (see e.g. Gatehouse et al. 2006 a,b).

The latter properties or signal parameters dealing with 'richness of environmental variations' comprises e.g. short time variations in the acoustical environment as reflected in changes in properties or signal parameters of the input signal. In an embodiment, the parameters or properties of the input signal are measured with a number of sensors or derived from the signal. In an embodiment, acoustic dose is e.g. measured with a dose meter over a predefined time, e.g. seconds, e.g. 5 or 10 seconds or more (cf. e.g. Gatehouse et al., 2006 a,b; Gatehouse et al., 2003).

In an embodiment, the customizable parameters of the cognitive model relate to one or more of the following properties of the user

- Long-term memory capacity and access speed,
- Phonological awareness including explicit ability to manipulate the phonological units of words, syllables, rhymes and phonemes,
- Phonological working memory capacity,
- Executive functions: includes three major activities: shifting, updating and inhibition capacity (cf. e.g. Miyake & Shah, 1999),
- Attention performance (cf. e.g. Awh, Vogel & Oh, 2006),
- Non-verbal working memory performance,
- Meaning extraction performance (cf. e.g. Hannon & Daneman, 2001),
- Phonological representations including phoneme discrimination, phoneme segmentation, and rhyme performance,
- Lexical access speed,
- Explicit storage and processing capacity in working memory,
- Pure tone hearing thresholds vs. frequency,
- Temporal fine structure resolution (cf. e.g. Hopkins & Moore, 2007), and
- Individual peripheral properties of the hearing aid user including hearing thresholds and thresholds of uncomfortable listening, spectro-temporal and masking abnormalities in sensorineural hearing loss, (cf. e.g. Gatehouse, 2006(a) and Gatehouse, 2006(b).

In an embodiment, the estimate of the present cognitive load of the user is determined or influenced by at least one direct measure of cognitive load for the user in question. In an embodiment, the estimate of the present cognitive load of the user is determined solely on the basis of at least one direct measure of cognitive load for the user in question. Alternatively, the estimate of the present cognitive load of the user is determined or influenced by a combination of inputs from a cognitive model and inputs from one or more direct measures of cognitive load of the user. In an embodiment, a direct measure of present cognitive load is used as an input to the cognitive model.

Any direct measure of current cognitive load can be used as an input to estimate current cognitive load. In a particular embodiment, however, a direct measure of cognitive load is obtained through ambulatory electroencephalogram (EEG).

In an embodiment, a direct measure of cognitive load is obtained through monitoring the body temperature.

In an embodiment, a direct measure of cognitive load is obtained through pupillometry.

In an embodiment, a direct measure of cognitive load is obtained through a push-button, which the hearing aid user presses when cognitive load is high.

In an embodiment, a direct measure of cognitive load is obtained in relation to a timing information, such as to the time of the day. Preferably, the timing information is related to a start time, such as the time the user awoke from a sleep or rest or the time when a user started on a work-related task (e.g. the stat time of a working period). In an embodiment, the method comprises the possibility for a user to set the start time.

A Hearing Aid System

A hearing aid system for processing an input sound and to provide an output stimulus according to a user's particular needs is furthermore provided by the present application. The system comprises an estimation unit for providing an estimate of present cognitive load of the user;

a signal processing unit for processing an input signal originating from the input sound according to the user's particular needs;

the system being adapted to influence said processing in dependence of the estimate the present cognitive load of the user.

In an embodiment, the hearing aid system comprises a hearing instrument adapted for being worn by a user at or in an ear. In an embodiment, the hearing instrument comprises at least one electric terminal specifically adapted for picking up electric signals from the user related to a direct measure of cognitive load. In an embodiment, the hearing instrument comprises a behind the ear (BTE) part adapted for being located behind an ear of the user, wherein at least one electric terminal is located in the BTE part. In an embodiment, the hearing instrument comprises an in the ear (ITE) part adapted for being located fully or partially in the ear canal of the user, wherein at least one electric terminal is located in the ITE part. In an embodiment, the system alternatively or additionally comprises one or more electric terminals or sensors NOT located in the hearing instrument but contributing to the direct measure of present cognitive load. In an embodiment, such additional sensors or electric terminals are adapted to be connected to the hearing instrument by a wired or wireless connection.

In an embodiment, the hearing instrument comprises an input transducer (e.g. a microphone) for converting an input sound to en electric input signal, a signal processing unit for processing the input signal according to a user's needs and providing a processed output signal and an output transducer (e.g. a receiver) for converting the processed output signal to an output sound. In an embodiment, the function of providing an estimate of the present cognitive load of the user is performed by the signal processing unit. In an embodiment, the functions of the cognitive model and/or the processing related to the direct measures of the cognitive load are performed by the signal processing unit. In an embodiment, the hearing instrument comprises a directional microphone system that can be controlled in accordance with the estimate of cognitive load. In an embodiment, the hearing instrument comprises a noise reduction system that can be controlled in accordance with the estimate of cognitive load. In an embodiment, the hearing instrument comprises a compression system that can be controlled in accordance with the estimate of cognitive load. The hearing instrument is a low power, portable device comprising its own energy source, typically a battery. The hearing instrument may in a preferred embodiment comprise a wireless interface adapted for allowing a wireless link to be established to another device, e.g. to a device picking up data related to direct measures of cognitive load of a user, e.g. voltages measured on body tissue of neural elements. In an embodiment, the estimate of present cognitive load of a user is fully or partially made in a physically separate device (from the hearing instrument, preferably in another body-worn device), and the result transmitted to the hearing instrument via a wired or wireless connection. In an embodiment, the hearing aid system comprises two hearing instruments of a binaural fitting. In an embodiment, the two hearing instruments are able to exchange data, e.g. via a wireless connection, e.g. via a third intermediate device. This has the advantage that signal related data can be better extracted (due to the spatial difference of the input signals picked up by the two hearing instruments) and that inputs to direct measures of cognitive load can be better picked up (by spatially distributed sensors and/or electric terminals).

In an embodiment, the hearing aid system comprises a memory wherein information about the user's working memory capacity is stored. In an embodiment, the estimation unit is adapted to provide an estimate of present cognitive load of the user based on the user's working memory capacity.

In an embodiment, the hearing aid system is adapted to estimate the present working memory span of the user. In an embodiment, the estimation unit is adapted to provide an estimate of the present cognitive load of the user based on the estimate of the present working memory span of the user.

It is intended that the process features of the method described above, in the detailed description of 'mode(s) for carrying out the invention' and in the claims can be combined with the system, when appropriately substituted by a corresponding structural features and vice versa. Embodiments of the system have the same advantages as the corresponding method.

A Computer Readable Medium

A tangible computer-readable medium storing a computer program is moreover provided by the present application, the computer program comprising program code means for causing a data processing system to perform the method described above, in the detailed description of 'mode(s) for carrying out the invention' and in the claims, when said computer program is executed on the data processing system.

A Data Processing System

A data processing system is moreover provided by the present application, the data processing system comprising a processor and program code means for causing the processor to perform the method described above, in the detailed description of 'mode(s) for carrying out the invention' and in the claims.

Further objects of the application are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The application will be explained more fully below in connection with a preferred embodiment and with reference to the drawings in which.

Figure 1A:
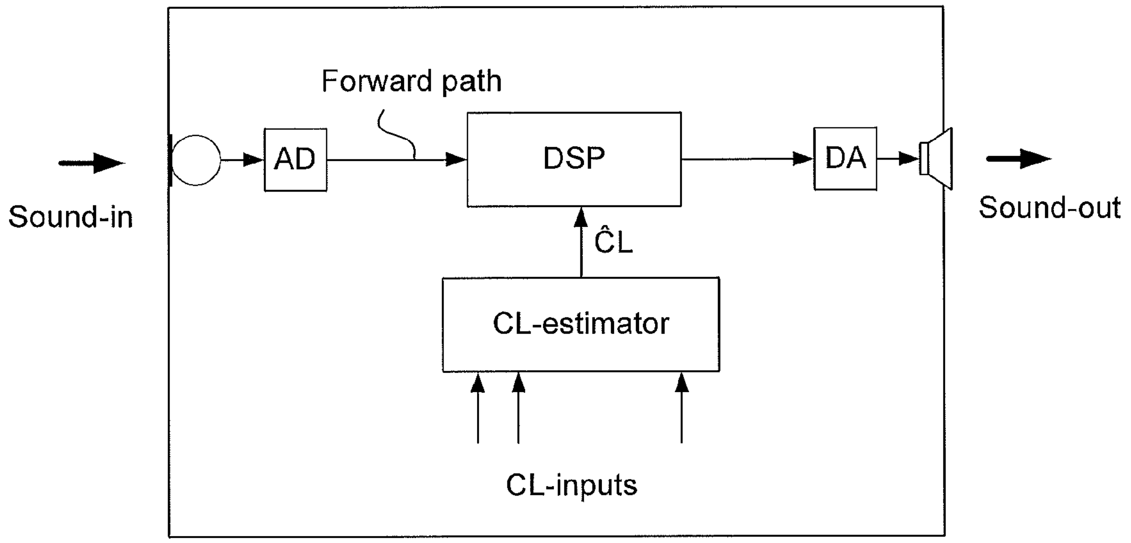
FIG. 1 shows a hearing aid system according to a first embodiment of the application.

The figures are schematic and simplified for clarity, and they just show details which are essential to the understanding of the invention, while other details are left out.

Further scope of applicability of the present disclosure will become apparent from the detailed description given hereinafter. However, it should be understood that the detailed description and specific examples, while indicating preferred embodiments of the application, are given by way of illustration only, since various changes and modifications within the spirit and scope of the disclosure will become apparent to those skilled in the art from this detailed description.

MODE(S) FOR CARRYING OUT THE INVENTION

Recent data have been published that suggest that individual cognitive abilities are pertinent to different listening conditions (e.g., Craik, 2007; Gatehouse et al., 2003, 2006b; Lunner, 2003; Humes et al., 2003, Foo et al., 2007; Zekveld et al., 2007).

Working Memory (WM) and Individual Differences:

When listening become difficult, e.g. because of many sound sources interfering with the target signal or because of a poorly specified input signal due to hearing impairment, listening must rely more on knowledge and context than would be the case when the incoming signal is clear and undistorted. This shift from mostly bottom-up (signal-based) to mostly top-down (knowledge-based) processing manifests as listening being more effortful.

The trade-offs between effortless bottom-up processing and effortful top-down processing and the allocation of cognitive resources to perception during effortful listening can be conceptualized in terms of working memory (Jarrold & Towse, 2006; Baddeley & Hitch, 1974; Baddeley, 2000; Daneman & Carpenter, 1980). The model of WM assumes that there is a limited resource capacity that constrains the amount of information that can be processed and stored (Just & Carpenter, 1992).

However, the conceptual definition of WM capacity is not straightforward. According to Feldman Barrett et al. (2004), there is no generally agreed upon definition of WM capacity. There are several aspects or components to WM, and individual differences in WM function could result from each of them. Indeed, researchers have investigated a variety of properties that contribute to individual differences in WM (e.g., resource allocation, Just & Carpenter, 1992; buffer size, Cowan, 2001; processing capacity, Halford et al., 1998).

Nevertheless, in the following it is assumed that, within the capacity constraint, resources can be allocated to either processing or storage or both. An insufficient capacity for the total activation required for a particular task may result when either the storage demands or the processing demands for activation are exceeded. The result may be task errors, loss of information from temporary storage (temporal decay of memories, forgetting) or slower processing.

Both the storage and processing functions of WM are necessary for the performance of most complex tasks, including language comprehension. For example, in a conversation in a noisy background, information must be stored in WM in order to make sense of subsequent information. At the same time some words or fragments are possibly missed as a consequence of both the hearing loss and the interfering noise, and thus some of the limited cognitive processing resources need to be allocated to inferring what is being said.

For a given individual, many factors which tax the processing function of working memory will result in fewer resources being allocated to its storage function. Pichora-Fuller (2007) reviewed examples of conditions that would increase processing demands with a possible consequent reduction in storage; they include e.g. adding a secondary motor task such as finger tapping (e.g., Kemper et al., 2003) or walking over obstacles (e.g., Li et al., 2001), and distorting the signal or reducing the signal-to-noise ratio (SNR) or the availability of supportive contextual cues (e.g., Pichora-Fuller et al., 1995). Recall of words or sentences is better when the target speech is presented in less challenging than in more challenging backgrounds, progressing from quiet to a single competing speaker, to two competing speakers, to multi-talker babble, (Rabbitt, 1968; Tun & Wingfield 1999; Wingfield & Tun 2001; Pichora-Fuller et al., 1995).

Inter-individual and Intra-individual differences:

Pichora-Fuller (2007) made a very useful distinction between inter-individual differences and intra-individual differences in working memory capacity. When age is controlled for, there are still significant differences between individual WM capacities (e.g., Daneman & Carpenter, 1980; Engle et al., 1992), i.e. there exists inter-individual differences in working memory capacity. Given the limited capacity assumption, the more of an individual's WM capacity is spent on processing information, the less remains to be spent on storage such that intra-individual differences in recall can be used to infer the differences in the processing demands placed on the individual in varying conditions (Pichora-Fuller, 2003, 2007). Thus, intra-individual performance in recall tasks would be affected if storage demand exceeds (remaining) storage capacity for conditions requiring large processing demands, e.g. poor SNR.

Figure 5A:
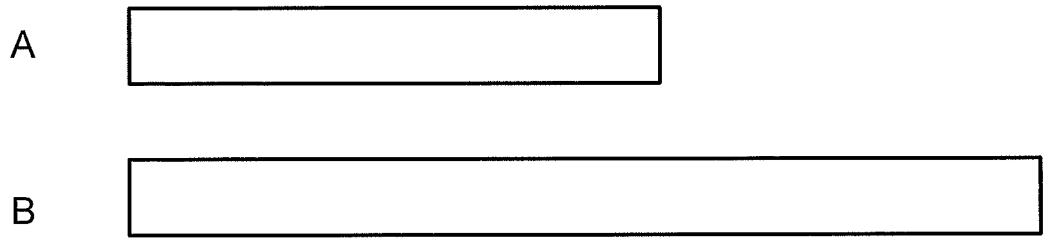
Figure 5B:
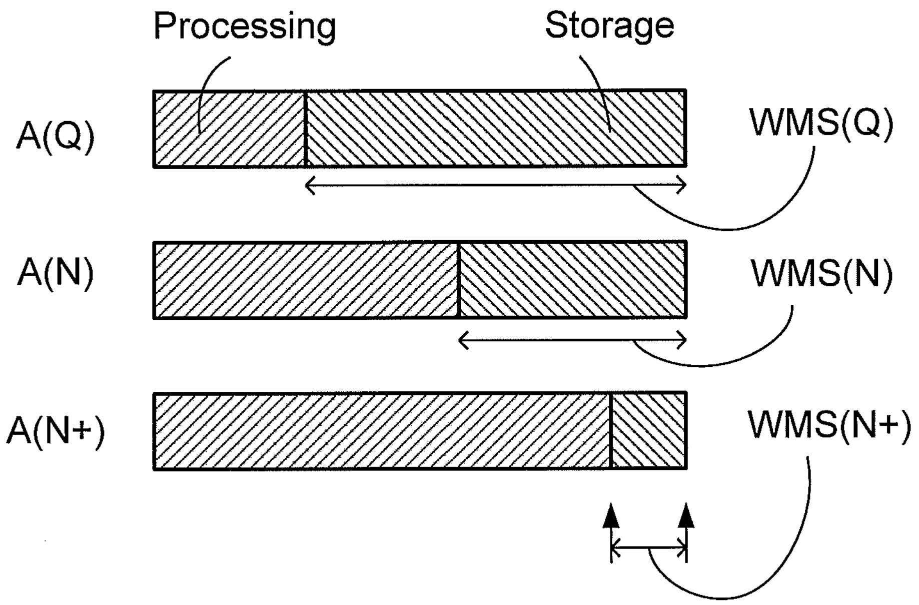

Complex working memory tasks have simultaneous storage (maintaining information in an active state for later recall) and processing (manipulating information for a current computation) components (Daneman & Carpenter, 1980). In the typical WM span task using sentences, the test subject reads or listens to a sentence and completes a task that requires trying to understand the whole sentence (by reading it aloud, repeating it, or judging it for some property such as whether the sentence make sense or not). Following the presentation of a set of sentences, the test subject is asked to recall the target word (often the sentence-final or sentence-initial word) of each sentence in the set. The number of sentences in the recall set is incremented and the span score typically reflects the maximum number of target words that are correctly recalled. Individuals with larger spans are considered (e.g., Daneman & Carpenter, 1980) to have better language processing abilities than individuals with smaller spans. FIG. 5*a* schematically illustrates the working memory capacity of two individual persons A and B, A having the relatively smaller and B the relatively larger working memory capacity. This then represents 'inter-individual differences'. For a given individual, conditions in which larger spans are measured are considered to demand less processing than conditions in which smaller spans are measured. FIG. 5*b* schematically illustrates intra-individual differences in working memory span (WMS) for the same individual A in three different listening environments Q=quiet, N=noise, N+=more noise, showing the relationship that a more difficult listening condition results in a smaller WMS. The concepts illustrated in FIG. 5 are adopted from Pichora-Fuller, 2007.

Intra-individual differences might be used to evaluate outcome insofar as increases in working memory span post hearing-aid intervention would suggest that the intervention has resulted in fewer processing resources being allocated to listening because it has become easier (Pichora-Fuller, 2007). In other words, increases in WM span post hearing-aid intervention (i.e. intra-individual improvements in WM storage) would suggest that the intervention has resulted in listening becoming easier with fewer WM processing resources needing to be allocated.

Inter-individual differences may be used to guide who will benefit from a particular hearing-aid signal processing scheme, under a given circumstance, such that the benefits and disadvantages of the signal processing is traded-off against the available individual WM capacity. That is, the individual working memory capacity may, in a given listening condition, determine when it is beneficial or disadvantageous to use a certain signal processing scheme.

Therefore an estimate of present cognitive load is advantageous in determining an appropriate processing scheme of a hearing aid in a specific listening situation (for a specific individual). With reference to FIG. 5, the total WM capacity of an individual can e.g. be estimated in advance of the use of a hearing aid (e.g. in a fitting situation). The WMS of the individual in different listening situations (being indicative of present cognitive load) can e.g. be estimated by a model of the human auditory system and/or by a direct measurement, e.g. by an EEG measurement, and/or from a detector of the current auditory environment, cf. below.

Working Memory and Hearing Loss:

Listening becomes effortful in challenging signal-to-noise ratios (SNR) for people with hearing loss, and speech recognition performance is affected for hearing-impaired people even in relatively favourable SNR conditions (e.g., Plomp, 1988, McCoy et al., 2005; van Boxtel et al., 2000; Larsby et al., 2005). Since increased listening effort corresponds to limited WM resources being disproportionally allocated to perceptual processing, thereby leaving fewer resources remaining for storage, it would be expected that listeners who are hard-of-hearing would be poorer than normal-hearing listeners on complex auditory tasks. Indeed, results by Rabbitt (1990) suggest that for listeners who are hard-of-hearing, information processing capacity resources are allocated to a greater extent to the task of initially perceiving the speech input, leaving fewer resources for subsequent recall.

Figure 6:
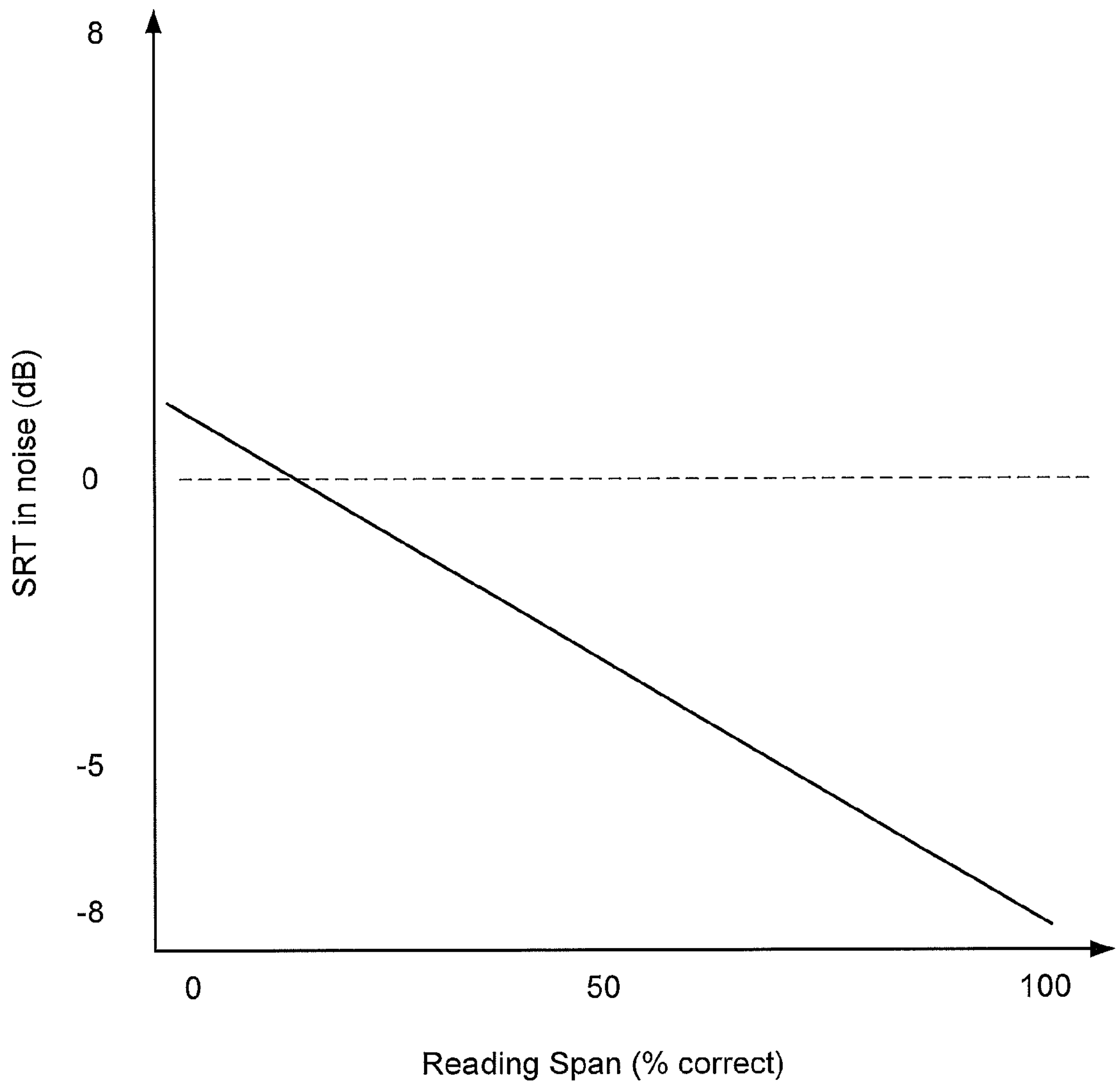

Example of Intra-Individual Differences Including Hearing Loss. Aided Speech Recognition in Noise:

Lunner (2003) reported an experiment where 72 clinical hearing-impaired subjects with similar pure tone audiograms were aided to assure audibility of the target signal and tested for speech reception thresholds in noise. Pure tone hearing thresholds did not explain the (up to 10 dB SNR) across-subject variation in speech reception thresholds. However, the individual working memory capacity, as measured by the reading span test (Daneman & Carpenter, 1980; Rönnberg, 1990), explained about 40% of the inter-individual variance, indicating that larger working memory capacity is associated with greater resistance to interfering noise. This trend of the experimental results is schematically shown in FIG. 6. Thus, it is reasonable to assume that the working memory capacity is challenged at the speech reception threshold.

Hearing Aid Signal Processing and Individual WM Differences:

Hearing aid processing itself may challenge listening, such that individual differences in cognitive processing resources are related to listening success with specific types of technology.

Today, there are several 'helping' systems available in hearing aids that are intended to aid the hearing impaired in challenging listening situations. Usually the objective is, by some means, to remove signals that are considered less important and/or to emphasize or enhance signals that are considered more important. The systems that are widespread in commercial hearing aids include directional microphones, noise reduction schemes, as well as fast acting wide dynamic range compression schemes. All of these systems have their benefits and disadvantages with regard to applicability in different situations. In the following, these systems, as well as a few examples of possible future systems, are reviewed in the light of individual WM differences. The line of arguments is that signal processing to improve speech recognition has both positive and negative consequences, but the consequences for the individual may depend on the individual WM capacity. Thus the wisdom of using the signal processing system in a given situation may depend on the hearing-aid user's individual WM capacity. The systems are discussed separately, although there may be interactions between these systems that have further consequences.

Hearing Aid Signal Processing Under Less Challenging Listening Situations:

Several studies indicate that pure tone hearing threshold elevation is the primary determinant of speech recognition performance in quiet background conditions, e.g. in a conversation with one person or listening to the television under otherwise undisturbed conditions (see e.g., Dubno et al, 1984; Schum et al, 1991; Magnusson et al, 2001). Thus, in less challenging situations, individual differences in working memory are possibly of secondary importance; the individual peripheral hearing loss constrains the performance, and the performance may largely be explained by audibility. Possession of greater working memory capacity confers relatively little benefit. In such situations it is probably redundant or even counterproductive to invoke extra 'helping' systems.

Directional Microphones in Challenging Listening Situations:

Function of Directional Microphones:

Modern hearing aids usually have the option of switching between omni-directional and directional microphones. Directional microphone systems are designed to take advantage of the spatial differences between speech and noise. Directional microphones are more sensitive to sounds coming from the front than sounds coming from the back and the sides. The assumption is that frontal signals are most important, while sounds from other directions are of less importance. Several algorithms have been developed to maximally attenuate moving or fixed noise source(s) from the rear hemisphere (see e.g. van den Bogaert et al. 2008)).

Usually there are algorithms that automatically switch between directional microphone and omni-directional microphone in situations that are estimated to be beneficial for the particular type of microphone. The decision to invoke the directional microphone is often based on an estimated SNR being below a given threshold value, and by estimations of whether the target signal is coming from the frontal position or not.

Benefits of Directional Microphones:

In a review by Ricketts (2005) the evidence of directional microphone benefit compared to omni-directional, i.e. the SNR improvement, is up to 6-7 dB, typically 3-4 dB, in certain noisy environments that are similar to those experienced in the real world; that is if (a) no more than moderate reverberation occurs, (b) the listener is facing the sound source of interest, and (c) the distance to this source is rather short. The SRT in noise shows improvements in accordance with the SNR improvements (Ricketts, 2005). Thus, in certain given situations, directional microphones give a clear and documented benefit.

Disadvantages With Directional Microphones:

If the target is not in front or if there are multiple targets, the attenuation of sources from other directions than frontal by directional microphones may interfere with the auditory scene (Shinn-Cunningham, 2008a, b). In natural communication, attention switches to different locations for monitoring purposes. Therefore, omni-directional microphones may be preferred in situations requiring shift of attention.

Van den Bogaert et al. (2008) have shown that directional microphone algorithms can have a large influence on the localization of target and noise source.

Unexpected or unmotivated automatic switches between directional and omni-directional microphones may be cognitively disturbing if the switching interferes with the listening situation (Shinn-Cunningham, 2008b).

Intra-individual Differences in WM and Directional Microphones:

Sarampalis et al. (2009) have investigated intra-individual differences by varying the SNR from −2 dB to +2 dB, simulating the improvement in SNR by directional microphones compared to omni-directional microphones. The WM test was a dual task where (a) the listening task involved repeating the last word of sentences presented over headphones, and (b) the second task was based on a memory task used by Pichora-Fuller et al. (1995) where, after every 8 sentences, the participant was asked to recall the last 8 words (s)he had reported. The results were that performance on the secondary memory recall task increased significantly in the +2 dB SNR.

This indicates that the directional microphone intervention may have the benefit of releasing working memory resources to retain storage capacity in certain noisy situations.

Individual WM Differences and Directional Microphones:

As noted above omni-directional microphones may be preferred in situations with conflicting/multiple targets that are not in the frontal position. On the other hand, the directional microphone intervention may release working memory resources. Therefore the decision of using directional microphones may be dependent on the individual WM capacity. Consider e.g. FIG. 6, and assume for example a situation with 0 dB SNR (dashed line). Inter-individual and intra-individual differences in WM capacity may also play a role in determining the benefit of directional microphones for a given individual in a given situation. Consider, for example, FIG. 6, in a situation with 0 dB SNR (dashed line). If we assume that the individual SRT in noise reflects the SNR at which WM capacity is severely challenged, FIG. 6 indicates that the WM capacity limit is challenged at about −5 dB for a high WM capacity person. At 0 dB SNR, the person with high WM capacity probably possesses the WM capacity to use the omni-directional microphone, while at −5 dB this person may need to sacrifice the omni-directional benefits and use the directional microphone to release WM resources. However, for the person with low WM capacity, even the 0 dB situation probably challenges WM capacity limits. Therefore, this person is probably best helped by selecting the directional microphone at 0 dB to release WM resources, thereby sacrificing the omni-directional benefits. Thus, it may be the case that the choice of SNR at which the directional microphone is invoked should be a trade-off between omni-directional and directional benefits and individual WM capacity, and that inter-individual differences in WM performance may be used to individually set the SNR threshold at which the hearing aid automatically shifts from omni-directional to directional microphone.

Thus, the choice to invoke directional microphone is a trade-off between omni-directional and directional benefits and dependent on the individual WM capacity. This suggests that inter-individual differences in WM performance may be used to individually set the SNR threshold at which the hearing aid automatically shifts from omni-directional to directional microphone.

Noise Reduction Systems in Challenging Listening Situations:

Noise reduction systems, or more specifically single microphone noise reduction systems, attempt to separate the target speech from disturbing noise by some separation algorithm operating on just one microphone input, where different amplification is applied to the separated speech and noise estimates, thereby enhancing the speech and/or attenuating the noise.

Noise Reduction Systems in Commercial Hearing Aids:

There are several approaches to obtain separate estimates of speech and noise signals. One approach in current hearing aids is to use the modulation index as a basis for the estimation. The rationale is that speech includes more level modulations than noise (see e.g. Plomp, 1994). Algorithms to calculate the modulation index usually operates in several frequency bands, and if a frequency band includes a high modulation index, the band is classified as including speech and is therefore given more amplification, while frequency bands with less modulations are classified as noise and thus attenuated (see e.g. Holube et al., 1999). Other noise reduction approaches include the use of the level-distribution function for speech (EP 0 732 036) or voice-activity detection by synchrony detection (Schum, 2003). However, the estimation of speech and noise components on a short-term basis (milliseconds) is very difficult, and misclassifications may occur. Therefore, commercial noise reduction systems in hearing aids are typically very conservative in the estimation of speech and noise components, and therefore only give a rather long-term estimation of noise or speech. Such systems have not shown improvements in speech recognition in noise (Bentler & Chiou, 2006). Nevertheless, typical commercial noise reduction systems do give a reduction in overall loudness of the noise, which is thus rated as more comfortable than without this system (Schum, 2003) and the annoyance and fatigue associated with using hearing aids may therefore be reduced.

Short-term Noise Reduction Methods:

More aggressive forms of noise reduction systems are found in the literature including 'spectral subtraction' or weighting algorithms where the noise is estimated either in brief pauses of the target signal or by modeling the statistical properties of speech and noise (e.g. Ephraim & Malah, 1984; Martin, 2001; Martin & Breithaupt, 2003; Lotter & Vary 2003; for a review see Hamacher et al., 2005). The estimates of speech and noise are subtracted or weighted on a short-term basis in a number of frequency bands, which gives an impression of a less noisy signal. However, this comes at a cost of a new type of distortion usually called 'musical noise'. This 'extraneous' artifactual signal possibly increases cognitive load, which may consume working memory resources. Thus, in optimizing these algorithms there is a trade-off between the amount of noise-reduction and the amount of distortion.

Intra-individual Differences in WM and Short-term Noise Reduction:

Sarampalis et al. (2006, 2008, 2009) investigated normal-hearing listeners and listeners with mild to moderate sensorineural hearing loss with and without a noise reduction scheme based on the Ephraim & Malah (1984) algorithm. The test was a dual-task paradigm with the primary task being immediate repetition of heard sentences, and the secondary task was subsequent recall after eight sentences. The sentence material was sentences of high and low context (Pichora-Fuller et al., 1995). For normal-hearing subjects there was some recall improvement with noise reduction in context-free sentences. Thus, the algorithm mitigated some of the deleterious effects of noise by reducing cognitive effort and improving performance in the recall task. Furthermore, listening effort was assessed using a dual task method, with listeners performing simultaneous, visual reaction time (RT) task. The results indicated that performance in the RT task was negatively affected by the presence of noise. However, the effect on the hearing-impaired subjects' performance was largely unaffected by noise reduction processing on or off. Sarampalis et al. (2008) therefore argued that with hearing loss there is a greater reliance on top-down processing when listening to speech in noise.

Binary Mask Approaches for Noise Reduction

Another recent approach to the separation of speech from speech-in-noise mixtures is the use of binary time-frequency masks (e.g. Wang, 2005; Wang, 2008; Wang et al., 2009). The aim of this approach is to create a binary time-frequency pattern from the speech/noise mixture. Each local time-frequency unit is assigned to either a 1 or a 0 depending on the local SNR. If the local SNR is favorable for the speech signal this unit is assigned a 1, otherwise it is assigned a 0. This binary mask is then applied directly on the original speech/noise mixture, thereby attenuating the noise segments. A challenge with this approach is to find the correct estimate of the local SNR.

However, ideal binary masks, IBM, have been used to investigate the potential of this technique for hearing impaired test subjects (Anzalone et al., 2006; Wang, 2008; Wang et al., 2009). In IBM-processing, the local SNR is known beforehand, which it would not be in a realistic situation with non-ideal detectors of speech and noise signals. Thus IBM is not directly applicable in hearing aids. Wang et al. (2009) evaluated the effects of IBM processing on speech intelligibility for hearing-impaired listeners, by assessing the SRT in noise. For a cafeteria background, Wang et al. (2009) observed a 15.6-dB SRT reduction (improvement) for the hearing-impaired listeners.

Nevertheless, IBM may produce cognitively loading distortions on the target speech signal, and even more in realistic binary mask applications where the speech and noise are not available separately, but have to be estimated. Thus, a trade-off has to be made between noise reduction and distortion in a realistic noise reduction system.

Intra-individual Differences in WM and Ideal Binary Masks:

In Wang et al. (2009) the average SRT in the cafeteria noise improved from −3.8 dB to −19.4 dB with IBM. If we assume that the individual SRT reflects the situation where the WM capacity is severely challenged, this indicates that applying IBM processing in difficult listening situations would release working memory resources to retain storage capacity and to regain speed in information processing.

Inter-Individual WM Differences and Realistic Noise Reduction Schemes.

In situations where the listener's cognitive system is unchallenged, using a noise reduction system may be redundant or even counterproductive. Thus, any benefits of noise reduction systems will probably only be evident in situations where the working memory system is challenged.

However, since realistic short-term noise reduction schemes (including realistic binary mask processing) will rely on a trade-off between amount of noise reduction and minimization of processing distortions, the invoking of such systems may be dependent on the individual WM differences, suggesting that persons with high WM capacity possibly can tolerate more distortions and thus more aggressive noise reduction than persons with low WM capacity in a given listening situation.

Fast Acting Wide Dynamic Range Compression in Challenging Listening Situations:

A fast-acting wide dynamic range compression (WDRC) system is usually called fast compression or syllabic compression, if it adapts rapidly enough to provide different gain-frequency responses for adjacent speech sounds with different short-time spectra.

A slow-acting WDRC system is usually called slow compression or automatic gain control. These systems keep their gain-frequency response nearly constant in a given speech/noise listening situation, and thus preserve the differences between short-time spectra in a speech signal. Hearing-aid compressors usually have frequency-dependent compression ratios, because the hearing loss varies with frequency. The compressive variations of the gain-frequency response are usually controlled by the input signal levels in several frequency bands. However, details of the implementation of signal processing tend to differ between studies, and WDRC can be configured in many ways, with different goals in mind (Dillon, 1996; Moore, 1998). In general, compression may be applied in hearing aids for at least three different objectives (e.g. Leijon & Stadler, 2008):

1. To present speech at comfortable loudness level, compensating for variations in voice characteristics and speaker distance.
2. To protect the listener from transient sounds that would be uncomfortably loud if amplified with the gain-frequency response needed for conversational speech.
3. To improve speech understanding by making also very weak speech segments audible, while still presenting louder speech segments at a comfortable level.

A fast compressor can to some extent meet all three purposes, whereas a slow compressor alone only can fulfill the first objective.

Fast compression may have two opposing effects with regard to speech recognition: (a) it provides additional amplification for weak speech components that might otherwise be inaudible, and (b) it reduces spectral contrast between speech sounds.

Figure 7:
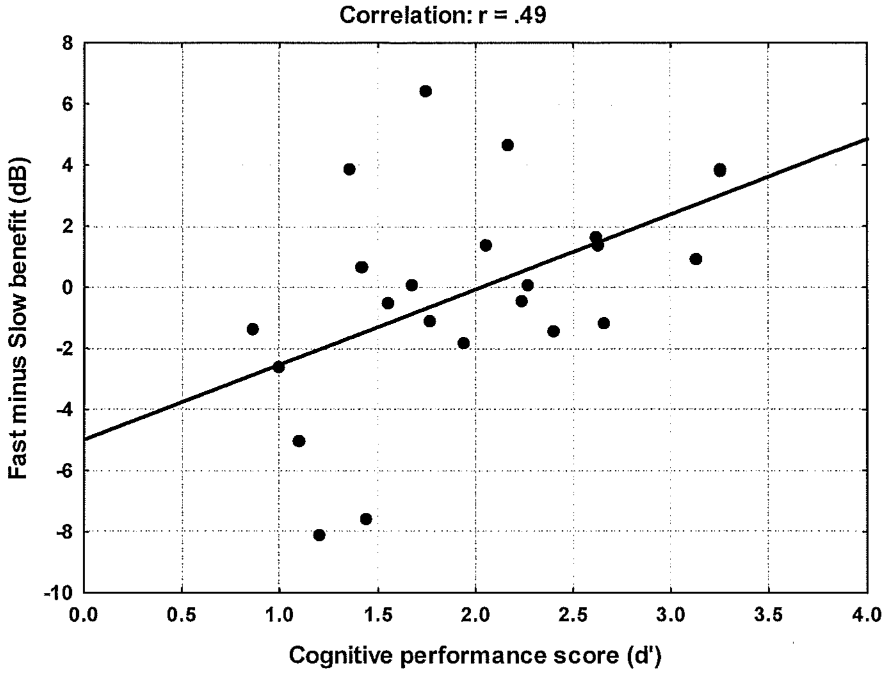
FIG. 7 shows a scatter plot and regression line showing the Pearson correlation between the cognitive performance score and differential benefit in speech recognition in modulated noise of fast versus slow compression (Lunner & Sundewall-Thorén, 2007).

Which of the opposing effects of fast compression are most important for speech recognition in noise for the individual is largely uninvestigated, including how individual WM capacity may affect the outcome. The first studies that systematically investigated individual differences by varying the speed of compression was Gatehouse et al. (2003, 2006a, 2006b). These studies indicated that the domains of cognitive capacity and auditory ecology are important to explain individual outcome of e.g. speech recognition in noise and subjectively assessed listening comfort. In a study that replicated the cognitive findings of the Gatehouse et al. studies (Lunner & Sundewall-Thorén, 2007), listeners' cognitive test scores were significantly correlated with the differential advantage of fast compression versus slow compression in conditions of modulated noise (cf. FIG. 7). FIG. 7 provides a scatter plot and regression line showing the Pearson correlation between the cognitive performance score and differential benefit in speech recognition in modulated noise of fast versus slow compression. A positive value on the Fast minus Slow benefit (dB) axis means that fast compression obtained better SRT in noise compared to slow compression (from Lunner & Sundewall-Thorén, 2007). However, there are other studies that show a somewhat different pattern of results with regard to cognitive performance and fast and slow compression (Foo et al., 2007, Rudner et al., 2008).

Individual WM Differences and Fast Compression:

Naylor & Johannesson (2009) have shown that the long-term SNR at the output of an amplification system that includes amplitude compression may be higher or lower than the long-term SNR at the input, dependent on interactions between the actual long term input SNR, the modulation characteristics of the signal and noise being mixed, and the amplitude compression characteristics of the system under test. Specifically, fast compression in modulated noise may under certain circumstances increase output SNR at negative SNRs, and decrease output SNR at positive SNRs. Such SNR changes may potentially affect perceptual performance for users of compression hearing aids. The SNR change from fast compression also affects perceptual performance in the same direction as the SNR change (G. Naylor, R. B. Johannessen & F. M. Rønne, personal communication, December 2008)—a person performing at low (negative) SNRs may under certain circumstances obtain benefit from fast compression while a person performing at high (positive) SNRs may obtain a disadvantage. Thus, it is the SNR at which listening takes place which determines if fast compression is beneficial or not. A person with high WM capacity with abilities to obtain a speech recognition threshold, SRT, in noise at negative SNR (see e.g. FIG. 6) would therefore benefit from fast compression in that situation, while a person with low WM capacity, whose SRT in noise is at positive SNRs would have a disadvantage from fast compression.

Cognitive Hearing Aids:

From the examples above it seems that inter-individual and intra-individual WM differences should be accounted for when developing hearing-aid signal-processing algorithms and when adjusting them for the individual hearing-aid user. The choice to invoke directional microphone is possibly a trade-off between omni-directional and directional benefits and dependent on the individual WM capacity. Realistic short-term noise reduction schemes will rely on a trade-off between amount of noise reduction and minimization of processing distortion and possibly dependent on the individual WM capacity. The trade-off between the fast compression benefits and disadvantages may be dependent on the individual WM capacity.

The signal processing systems above are described as 'helping systems for difficult situations'. They should be used only when it is beneficial to release cognitive resources; in less challenging situations it is possibly wisest to leave the brain to solve situations, only providing audibility of sounds with e.g. slow acting compression.

There is a need to monitor the individual cognitive load on a real-time basis, to be able to determine when the listening situation is so difficult that working memory resources are challenged. Therefore, there is a need to develop monitoring methods for estimating cognitive load. Two different lines emerge: indirect estimates of cognitive load and direct estimates of cognitive load.

Indirect estimates of cognitive load would use some form of cognitive model that is continuously updated with environment detectors that monitor the listening environment (e.g., level detectors, SNR detectors, speech activity detectors, reverberation detectors). The cognitive model also needs to be calibrated with the individual cognitive capacity (e.g., working memory capacity, verbal information processing speed), and the connections between listening environment monitors, hearing aid processing system, and cognitive capacities have to be established. Inspiration can possibly be found from the ease of language understanding (ELU) model of Rönnberg et al. (2008), which has a framework (yet rudimentary) for suggesting when a listener's working memory system switches from effortless implicit processing to effortful explicit processing.

Using direct estimates of cognitive load can be used as an alternative to or in combination with cognitive models. Relations between environment characteristics, signal processing features and/or cognitive relief can preferably be included in the estimate of cognitive load. A straightforward, but technically challenging direct estimate of cognitive load could be obtained by monitoring the ambulatory encephalogram (EEG, Gevins et al., 1997). Such a system has been proposed by Lan et al. (2007), in terms of an ambulatory cognitive state classification system to assess the subject's mental load based on EEG measurements, cf. below.

FIG. 1 shows a hearing aid system according to a first embodiment of the application.

Figure 1B:
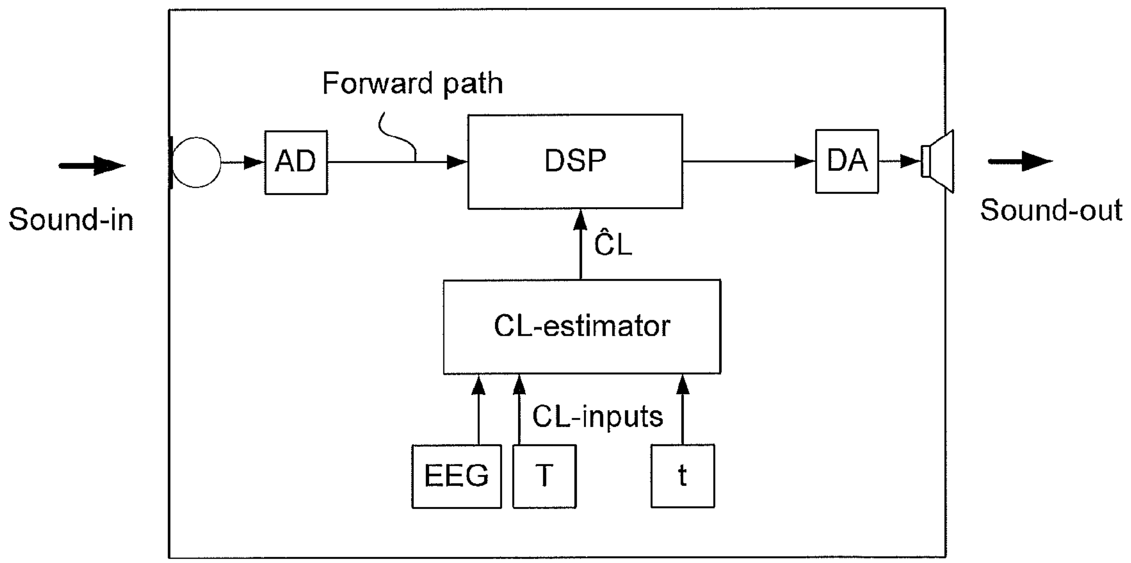

The hearing instrument in the embodiment of FIG. 1*a* comprises an input transducer (here a microphone) for converting an input sound (Sound-in) to en electric input signal, a signal processing unit (DSP) for processing the input signal according to a user's needs and providing a processed output signal and an output transducer (here a receiver) for converting the processed output signal to an output sound (Sound-out). In the embodiment of FIG. 1 (and FIG. 2), the input signal is converted from analogue to digital form by an analogue to digital converter unit (AD) and the processed output is converted from a digital to an analogue signal by a digital to an analogue converter (DA). Consequently, the signal processing unit (DSP) is a digital signal processing unit. In an embodiment, the digital signal processing unit (DSP) is adapted to process the frequency range of the input signal considered by the hearing instrument (e.g. between 20 Hz and 20 kHz) independently in a number of sub-frequency ranges or bands (e.g. between 2 and 64 bands or more, e.g. 128 bands). The hearing instrument further comprises an estimation unit (CL-estimator) for estimating the cognitive load of the user and providing an output $\hat{CL}$ indicative of the current cognitive load of the user, which is fed to the signal processing unit (DSP) and used in the selection of appropriate processing measures. The estimation unit receives one or more inputs (CL-inputs) relating to cognitive load and based thereon makes the estimation (embodied in estimation signal $\hat{CL}$). The inputs to the estimation unit (CL-inputs) may originate from direct measures of cognitive load (cf. FIG. 1*b*) and/or from a cognitive model of the human auditory system (cf. FIG. 2).

The estimation signal $\hat{CL}$ from the estimation unit is used to adapt the signal processing in dependence of $\hat{CL}$ (i.e. an estimate of present cognitive load).

FIG. 1*b* shows an embodiment of a hearing aid according to the disclosure which differs from the embodiment of FIG. 1*a* in that is comprises units for providing inputs to a direct measurement of current cognitive load of the user. In the embodiment of FIG. 1*b*, measurement units providing direct measurements of current EEG (unit EEG), current body temperature (unit T) and a timing information (unit t). Embodiments of the hearing instrument may contain one or more of the measurement units or other measurement units indicative of current cognitive load of the user. A measurement unit may be located in a separate physical body than other parts of the hearing instrument, the two or more physically separate parts being in wired or wireless contact with each other. Inputs to the measurement units may e.g. be generated by measurement electrodes for picking up voltage changes of the body of the user, the electrodes being located in the hearing instrument(s) and/or in physically separate devices, cf. e.g. FIG. 4 and the corresponding discussion.

The direct measures of cognitive load can be obtained in different ways.

In one embodiment, the direct measure of cognitive load is obtained through ambulatory electroencephalogram (EEG) as suggested by Lan et al. (2007) where an ambulatory cognitive state classification system is used to assess the subject's mental load based on EEG measurements (unit EEG in FIG. 1*b*). See e.g. Wolpaw et al. (2002).

Such ambulatory EEG may be obtained in a hearing aid by manufacturing two or more for the purpose suitable electrodes in the surface of a hearing aid shell where it contacts the skin inside or outside the ear canal. One of the electrodes is the reference electrode. Furthermore, additional EEG channels may be obtained by using a second hearing aid (the other ear) and communicating the EEG signal by wireless transmission of the EEG signal to the other ear (e2e) or by some other transmission line (e.g. wireless through another wearable processing unit or through local networks, or by wire).

Alternatively, the EEG signal may also be input to a neural network to serve as training data with the acoustic parameters to obtain a trained network based on acoustic input and direct cognitive measures of cognitive load.

The EEG signal is of low voltage, about 5-100 μV. The signal needs high amplification to be in the range of typical AD conversion, ($\sim 2^{-16}$ V to 1 V, 16 bit converter). High amplification can be achieved by using the analogue amplifiers on the same AD-converter, since the binary switch in the conversion utilises a high gain to make the transition from '0' to '1' as steep as possible. In an embodiment, the hearing instrument (e.g. the EEG-unit) comprises a correction-unit specifically adapted for attenuating or removing artefacts from the EEG-signal (e.g. related to the user's motion, to noise in the environment, irrelevant neural activities, etc.).

In another embodiment, direct measures of cognitive load can be obtained through monitoring the body temperature (unit T in FIG. 1*b*), an increased/altered body temperature indicating an increase in cognitive load. The body temperature may e.g. be measured using one or more thermo elements, e.g. located where the hearing aid meets the skin surface. The relationship between cognitive load and body temperature is e.g. discussed in Wright et al. (2002).

In another embodiment, direct measures of cognitive load can be obtained through pupillometry using eye-cameras. More contracted pupils mean relatively higher cognitive load than less contracted pupils. The relationship between cognitive (memory) load and pupillary response is e.g. discussed in Pascal et al. (2003).

In another embodiment, direct measures of cognitive load can be obtained through a push-button which the hearing aid user presses when cognitive load is high.

In another embodiment, direct measures of cognitive load can be obtained through measuring the time of the day, acknowledging that cognitive fatigue is more plausible at the end of the day (cf. unit t in FIG. 1*b*).

Figure 2:
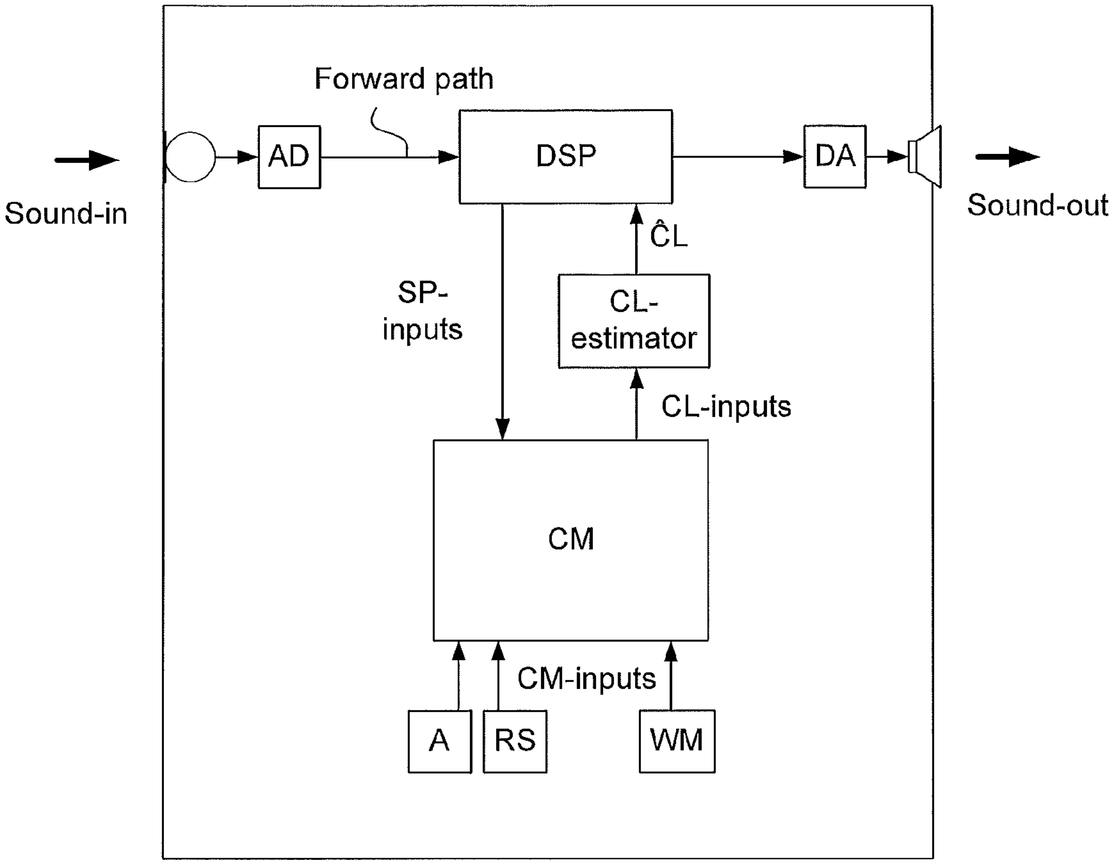
FIG. 2 shows a hearing aid system according to a second embodiment of the application, where cognitive model is used in the estimate of cognitive load.

FIG. 2 shows a hearing instrument according to a second embodiment of the application, where cognitive model is used in the estimate of cognitive load.

The embodiment of a hearing instrument shown in FIG. 2 comprises the same elements as shown in FIG. 1*a* and discussed in relation therewith. The hearing instrument of FIG. 2 further comprises a cognitive model of the human auditory system (CM in FIG. 2). The cognitive model (CM) is e.g. implemented as algorithms with input parameters received via input signals indicative of a users relevant mental skills (CM inputs in FIG. 2), typically customized to the user in question, and inputs indicative of relevant properties of the electric input signal (SP inputs in FIG. 2). Based on the inputs and the model algorithms one or more output signals (CL-inputs in FIG. 2) indicative of the cognitive load of the person in question is/are generated by the cognitive model (CM unit). These outputs are fed to the estimation unit (CL-estimator) for estimating the cognitive load of the user and providing an output $\hat{CL}$ indicative of the current cognitive load of the user, which is fed to the signal processing unit (DSP) and used in the selection of appropriate processing measures. The output $\hat{CL}$ indicative of the current cognitive load of the user allows to at least differentiate between two mental states HIGH and LOW use of mental resources (cognitive load). Preferably more than two levels of estimated cognitive load are implemented, e.g. 3 levels (LOW, MEDIUM and HIGH). The cognitive model is e.g. implemented as part of a digital signal processing unit (e.g. integrated in the signal processing unit DSP in FIG. 2).

Based on the signal output(s) $\hat{CL}$ of the estimation unit, the signal processing unit (DSP) adapts its processing. The processing of the electrical input is a function of the cognitive load and characteristics of the input signal.

The user specific inputs (indicative of a user's relevant mental skills) to the cognitive model comprise one or more of parameters such as user age, user long term memory, user lexical access speed, user explicit storage and processing capacity in working memory, user hearing loss vs. frequency, etc. The user specific inputs are typically determined in advance in an 'off-line'-procedure, e.g. during fitting of the hearing instrument to the user.

The signal specific inputs to the cognitive model comprise one or more of parameters such as time constants, amount of reverberation, amount of fluctuation in background sounds, energetic vs. informational masking, spatial information of sound sources, signal to noise ratio, etc.

The appropriate processing measures taken in dependence of the inputs related to a user's cognitive load are e.g. selected among the following functional helping options, directional information schemes, compression schemes, speech detecting schemes, noise reduction schemes, time-frequency masking scheme, and combinations thereof.

The cognitive model (CM) shall, in real-time in the hearing instrument, predict to what extent at the moment explicit/effortful processing is required from the individual based on (a) parameters which may be extracted from the acoustical input (SP-inputs, e.g. amount of reverberation, amount of fluctuation in background sounds, energetic vs. informational masking, spatial information of sound sources) and (b) apriori knowledge of the individual persons' cognitive status (CM-inputs, e.g. WM capacity, spare resources, quality of long-term memory templates, speed of processing). In an embodiment, the hearing instrument is adapted to provide basis for online testing of the person's cognitive status. In an embodiment, the cognitive model is based on neural networks.

Figure 3:
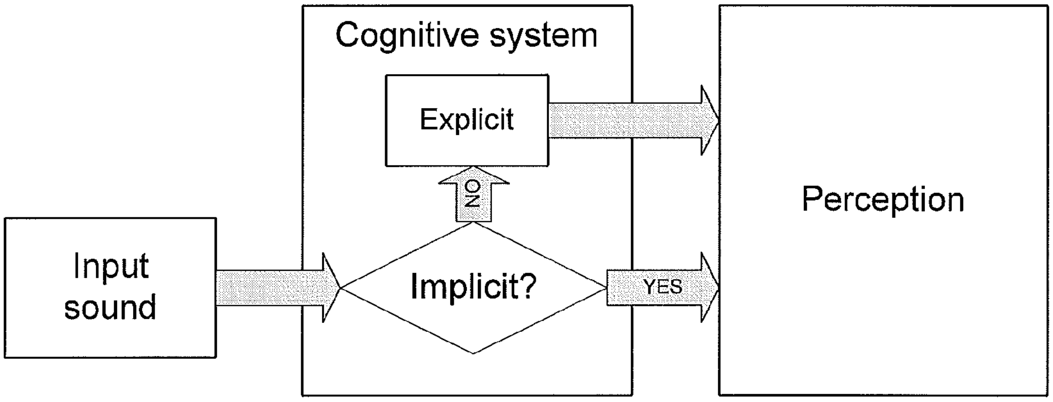
FIG. 3 shows a simplified sketch of the human cognitive system relating to auditory perception.

FIG. 3 shows a simplified sketch of the human cognitive system relating to auditory perception. An input sound (Input sound) comprising speech is processed by the human auditory system (Cognitive system, Perception). In an optimum listening situation, the speech signal is processed effortlessly and automatically (Implicit? YES=>implicit processing). This means that the cognitive processing involved is largely unconscious and implicit. However, listening conditions are often suboptimum, which means that implicit cognitive processes may be insufficient to unlock the meaning in the speech stream (Implicit? NO=>explicit processing). Resolving ambiguities among previous speech elements and constructing expectations of prospective exchanges in the dialogue are examples of the complex processes that may arise. These processes are effortful and conscious and thus involve explicit cognitive processing (Explicit). Both cases deliver some sort of perception of the input sound (Perception). The aim of the present disclosure is to include an estimate of current cognitive load (e.g. the differentiation between implicit and explicit processing of an incoming sound) in decisions concerning current optimum signal processing to provide an improved perception of the input sound for a user (compared to a situation where such decisions were taken based solely on the characteristics of the input sound signal and predefined settings of the hearing instrument, e.g. during fitting).

FIG. 4 shows various embodiments of a hearing aid system according to the application. The hearing aid systems of FIG. 4 comprise a hearing instrument adapted for being worn by a user 1 at or in an ear. FIG. 4*a* shows an 'in the ear' (ITE) part 2 of a hearing instrument. In an embodiment, the ITE part constitutes the hearing instrument. The ITE part is adapted for being located fully or partially in the ear canal of the user 1. The ITE part 2 comprises two electric terminals 21 located on (or extending from) the surface of the ITE part. The ITE part comprises a mould adapted to a particular user's ear canal. The mould is typically made of a form stable plastic material by an injection moulding process or formed by a rapid prototyping process, e.g. a numerically controlled laser cutting process (see e.g. EP 1 295 509 and references therein). A major issue of an ITE part is that it makes a tight fit to the ear canal. Thus, electrical contacts on the surface (or extending from the surface) of the mould contacting the walls of the ear canal are inherently well suited for forming an electrical contact to the body. FIG. 4*b* shows another embodiment of a (part of a) hearing instrument according to the application. FIG. 4*b* shows a BTE part 20 of a 'behind the ear' hearing instrument, where the BTE part is adapted for being located behind the ear (pinna, 12 in FIGS. 4*c* and 4*d*) of a user 1. The BTE part comprises 4 electric terminals 21, two of which are located on the face of the BTE part, which is adapted for being supported by the ridge where the ear (Pinna) is attached to the skull and two of which are located on the face of the BTE part adapted for being supported by the skull. The electric terminals are specifically adapted for picking up electric signals from the user related to a direct measure of cognitive load of the user. The electrical terminals may all serve the same purpose (e.g. measuring EEG) or different purposes (e.g. three for measuring EEG and one for measuring body temperature). Electrical terminals (electrodes) for forming good electrical contact to the human body are e.g. described in literature concerning EEG-measurements (cf. e.g. US 2002/028991 or U.S. Pat. No. 6,574,513).

Figure 4A:
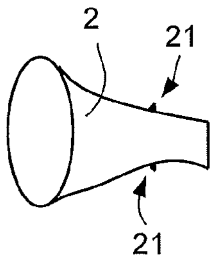
FIG. 4 shows various embodiments of a hearing aid system according to the application, FIG. 5*a* schematically shows inter-individual differences in working memory capacity between two individuals A and B and FIG. 5*b* schematically shows intra-individual differences in working memory span (WMS) for individual A in three different listening environments Q=quiet, N=noise, N+=more noise, FIG. 6 schematically shows results from experiments where clinical hearing-impaired subjects with similar pure tone audiograms were aided to assure audibility of the target signal and tested for speech reception thresholds (SRT) in noise (Lunner, 2003)
Figure 4B:
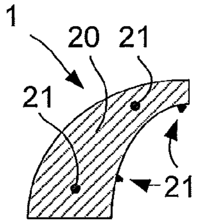
Figure 4C:
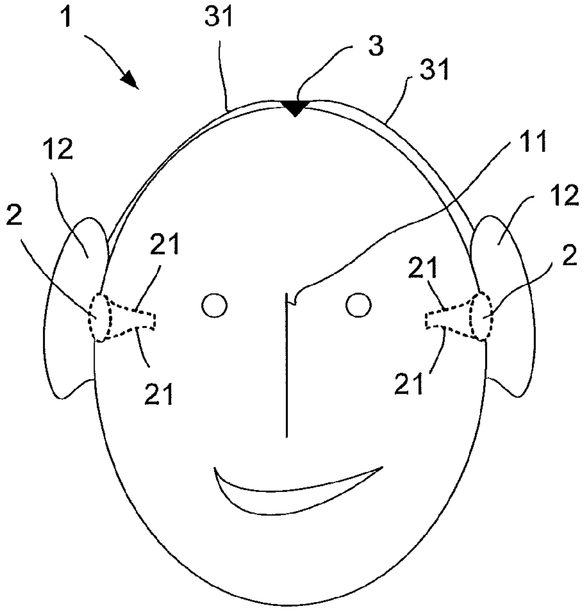

FIG. 4*c* shows an embodiment of a hearing aid system according to the application, which additionally comprises an electric terminal 3 or sensor contributing to the direct measure of present cognitive load but NOT located in the hearing instrument 21. In the embodiment of FIG. 4*c*, the additional electric terminal 3 is adapted to be connected to the hearing instrument by a wired connection between the electric terminal 3 and one or both ITE parts 2. The electric terminal preferably comprises an electronic circuit for picking up a relatively low voltage (from the body) and for transmitting a value representative of the voltage to the signal processor of the hearing instrument (here located in the ITE-part). The wired connection may run along (or form part of the) flexible support members 31 adapted for holding the electric terminal in place on the head of the user. At least one of the additional electric terminals (here electric terminal 3) is/are preferably located in a symmetry plane of the head of the user (e.g. as defined by the line 11 of the nose of the user, the ears being located symmetrically about the plane) and e.g. constituting a reference terminal.

Figure 4D:
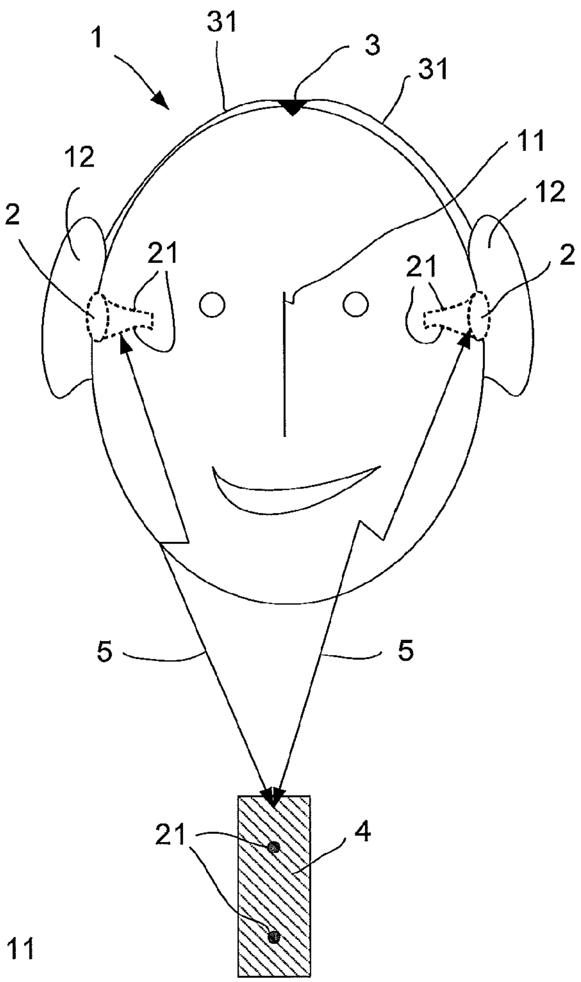

FIG. 4*d* shows an embodiment of a hearing aid the system according to the application, which additionally comprises a number of electric terminals or sensors contributing to the direct measure of present cognitive load, which are NOT located in the (here ITE) hearing instrument 2. The embodiment of FIG. 4*d* is identical to that of FIG. 4*c* apart from additionally comprising a body-mounted device 4 having 2 extra electric terminals 21 mounted in good electrical contact with body tissue. In an embodiment, the device 4 comprises amplification and processing circuitry to allow a processing of the signals picked up by the electric terminals. In that case the device 4 can act as a sensor and provide a processed input to the estimate of present cognitive load of the user (e.g. the estimate itself). The device 4 and at least one of the hearing instruments 2 each comprise a wireless interface (comprising corresponding transceivers and antennas) for establishing a wireless link 5 between the devices for use in the exchange of data between the body-mounted device 4 and the hearing instrument(s) 2. The wireless link may be based on near-field (capacitive of inductive coupling) or far-field (radiated fields) electromagnetic fields.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

REFERENCES

Anzalone, M. C., Calandruccio, L., Doherty, K. A. & Carney, L. H. (2006). Determination of the potential benefit of time-frequency gain manipulation. Ear and Hearing, Vol. 27, 2006, pp. 480-492.

Awh E., Vogel E. K. & Oh S. H. (2006), Interactions between attention and working memory, Neuroscience, Vol. 139, 2006, pp. 201-208.

Baddeley, A. D. & Hitch, G. J. (1974). Working memory. In G. H. Bower (ed.), The psychology of learning and motivation, Vol. 8, pp. 47-89. New York, N.Y.: Academic Press, 1974.

Baddeley A. D. (2000). The episodic buffer: a new component of working memory? Trends Cogn. Science, Vol. 4, 2000, pp. 417-423.

Cowan, N. (2001). The magical number 4 in short-term memory: A reconsideration of mental storage capacity. Behavioral and Brain Sciences, Vol. 24, 2001, pp. 87-185.

Craik, F. I. M. (2007). Commentary: The role of cognition in age-related hearing loss. Journal of the American Academy of Audiology, Vol. 18, 2007, pp. 539-547.

Daneman, M. & Carpenter, P. A. (1980). Individual differences in integrating information between and within sentences. Journal of Experimental Psychology: Learning, Memory and Cognition, Vol. 9, 1980, pp. 561-584.

Dillon, H. (1996). Compression? Yes, but for low or high frequencies, for low or high intensities, and with what response times? Ear and Hearing, Vol. 17, 1996, pp. 287-307.

Dillon H. (2001), Hearing Aids, Thieme, New York-Stuttgart, 2001.

Dubno, J. R., Dirks, D. D. & Morgan, D. E. (1984). Effects of age and mild hearing loss on speech recognition in noise. Journal of the Acoustical Society of America, Vol. 76(1), 1984, pp. 87-96.

Edwards B. (2007), The Future of Hearing Aid Technology, Trends in Amplification, Vol. 11, No. 1, 2007, pp. 31-46.

Engle, R. W., Cantor, J. & Carullo, J. J. (1992). Individual differences in working memory and comprehension: A test of four hypotheses. Journal of Experimental Psychology: Learning, Memory, and Cognition, Vol. 18, 1992, pp. 972-992.

Engle W., Kane J. M. & Tuholski S. W. (1999), Individual differences in working memory capacity and what they tell us about controlled attention, general fluid intelligence, and functions of the prefrontal cortex. In A. Myake & P. Shah (Eds.), Models of working memory, 1999, pp. 102-134, Cambridge (CUP).

EP 0 732 036 B1 (TOEPHOLM & WESTERMANN) Sep. 19, 1996

EP 1 295 509 (PHONAK) Mar. 26, 2003.

Ephraim, Y. & Malah, D. (1984). Speech enhancement using a minimum mean-square error short-time spectral amplitude estimator, IEEE Transactions on Acoustics, Speech and Signal Processing, Vol. 32(6), 1984, pp. 1109-1121.

Feldman Barrett, L, Tugade, M. M. & Engle, R. W. (2004). Individual Differences in Working Memory Capacity and Dual-Process Theories of the Mind. Psychological Bulletin, Vol. 130(4), 2004, pp. 553-573.

Foo C., Rudner M., Rönnberg J. & Lunner T. (2007), Recognition of speech in noise with new hearing instrument compression release settings requires explicit cognitive storage and processing capacity, J. Am. Acad. Audiol., Vol. 18, 2007, pp. 553-566.

Gatehouse, S., Naylor, G. & Elberling, C. (2003), Benefits from hearing aids in relation to the interaction between the user and the environment, Int. J. Audiol., Vol. 42 (Suppl 1), 2003, pp. S77-S85.

Gatehouse et al. (2006a), Gatehouse S., Naylor G., Elberling C., Linear and nonlinear hearing aid fittings—1. Patterns of benefit, Int. J. Audiol. Vol. 45(3), March 2006, pp. 130-52.

Gatehouse et al. (2006b), Gatehouse S., Naylor G., Elberling C., Linear and nonlinear hearing aid fittings—2. Patterns of candidature, Int. J. Audiol., Vol. 45(3), March 2006, pp. 153-71.

Gevins, A., Smith, M. E., McEvoy, L. & Yu, D. (1997). High resolution EEG mapping of cortical activation related to working memory: effects of task difficulty, type of processing, and practice. Cerebral Cortex, Vol. 7(4), 1997, pp. 374-385.

Gobet, F., Lane, P. C. R., Croker, S., Cheng, P. C-H., Jones, G., Oliver, I. & Pine, J. M. (2001), Chunking mechanisms in human learning, TRENDS in Cognitive Sciences, Vol. 5, 2001, pp. 236-243.

Gobet, F. & Simon, H. A. (2000), Five seconds or sixty? Presentation time in expert memory, Cognitive Science, Vol. 24, 2000, pp. 651-682.

Halford, G. S., Wilson, W. H. & Phillips, S. (1998). Processing capacity defined by relational complexity: Implications for comparative, developmental, and cognitive psychology. Behavioral and Brain Sciences, Vol. 21, 1998, pp. 803-865.

Hamacher, V., Chalupper, J., Eggers. J., Fischer, E., Kornagel, U., Puder, H. & Rass U. (2005). Signal Processing in High-End Hearing Aids: State of the Art, Challenges, and Future Trends. EURASIP Journal on Applied Signal Processing, Vol. 18, 2005, pp. 2915-2929.

Hannon B. & Daneman M. (2001), A new tool for measuring and understanding individual differences in the component processes of reading comprehension, J. Educ. Psychol., Vol. 93 (1), 2001, pp. 103-128.

R. C. Hendriks, R. Heusdens, and J. Jensen (2005), Adaptive time segmentation of noisy speech for improved speech enhancement; in IEEE Int. Conf. Acoust., Speech, Signal Processing, March 2005, Vol. 1, pp. 153. 156.

Holube, I., Hamacher, V. & Wesselkamp, M. (1999). Hearing Instruments: noise reduction strategies, in Proc. 18th Danavox Symposium: Auditory Models and Non-linear Hearing Instruments, Kolding, Denmark, September.

Hopkins & Moore (2007), Moderate cochlear hearing loss leads to a reduced ability to use temporal fine structure information, J Acoust. Soc. Am., Vol. 122(2), 2007, pp. 1055-1068.

Humes, L. E., Wilson, D. L. & Humes, A. C. (2003). Examination of differences between successful and unsuccessful elderly hearing aid candidates matched for age, hearing loss and gender. International Journal of Audiology, Vol. 42, 2003, pp. 432-441.

Jarrold, C. & Towse, J. N. (2006). Individual differences in working memory. Neuroscience, Vol. 139, 2006, pp. 39-50.

Jones, G., Gobet, F., & Pine, J. M. (2009), Linking working memory and long-term memory: A computational model of the learning of new words. Developmental Science, Vol. 10, No. 6, November 2007, pp. 853-73.

Just, M. A. & Carpenter, P. A. (1992). A capacity theory of comprehension-individual differences in working memory. Psychological Review, Vol. 99, 1992, pp. 122-149.

Kates J. M. (2008), Digital Heaing Aids, ISBN13: 978-1-59756-317-8: Plural Publishing Inc, San Diego, Calif.

Kemper, S., Herman, R. E. & Lian, C. H. T. (2003). The costs of doing two things at once for young and older adults: Talking, walking, finger tapping, and ignoring speech or noise. Psychology and Aging, Vol. 18, 2003, pp. 181-192.

Lan et al. (2007), Lan T., Erdogmus D., Adami A., Mathan S. & Pavel M. (2007), Channel Selection and Feature Projection for Cognitive Load Estimation Using Ambulatory EEG, Computational Intelligence and Neuroscience, Volume 2007, Article ID 74895, 12 pages.

Laird, Rosenbloom, Newell, John and Paul, Allen (1987). "Soar: An Architecture for General Intelligence". Artificial Intelligence, Vol. 33, 1987, pp. 1-64.

Larsby, B., Hällgren, M., Lyxell, B. & Arlinger, S. (2005). Cognitive performance and perceived effort in speech processing tasks: Effects of different noise backgrounds in normal-hearing and hearing impaired subjects. International Journal of Audiology, Vol. 44(3), 2005, pp. 131-143.

Leijon, A & Stadler, S. (2008). Fast amplitude compression in hearing aids improve audibility but degrades speech information transmission. Internal report 2008-11; Sound and Image Processing Lab., School of Electrical Engineering, KTH, SE-10044, Stockholm, Sweden Li K. Z. H., Lindenberger U., Freund A. M. & Baltes P. B. (2001), Walking while memorizing: Age-Related differences in compensatory behavior. Psychol. Sci., Vol. 12 (3), 2001, pp. 230-237.

Lotter, T. & Vary, P. (2003). Noise reduction by maximum a posteriori spectral amplitude estimation with super gaussian speech modeling," in Proc. International Workshop on Acoustic Echo and Noise Control (IWAENC '03), pp. 83-86, Kyoto, Japan, September 2003.

Luce P. A. & Pisoni D. A. (1998), Recognising spoken words: the neighbourhood activation model, Ear Hear, Vol. 19, 1998, pp. 1-36.

Lunner T. (2003), Cognitive function in relation to hearing aid use, Int. J. Audiol., Vol. 42 (Suppl. 1), 2003, pp. S49-S58.

Lunner T. & Sundewall-Thorén E. (2007), Interactions between cognition, compression, and listening conditions: effects on speech-in-noise performance in a two-channel hearing aid, J. Am. Acad. Audiol., Vol. 18, 2007, pp. 539-552.

Magnusson, L., Karlsson, M. & Leijon, A. (2001) Predicted and measured speech recognition performance in noise with linear amplification. Ear and Hearing, Vol. 22(1), 2001, pp. 46-57.

Marslen-Wilson W. 1987. Functional parallelism in spoken word recognition. Cognition, Vol. 25, 1987, pp. 71-103.

Martin, R. & Breithaupt, C. (2003). Speech enhancement in the DFT domain using Laplacian speech priors, in Proc. International Workshop on Acoustic Echo and Noise Control (IWAENC '03), pp. 87-90, Kyoto, Japan, September 2003.

Martin, R. (1979). Noise power spectral density estimation based on optimal smoothing and minimum statistics. IEEE Transactions on Speech and Audio Processing, Vol. 9(5), 1979, pp. 504-512.

McClelland, J. L. & Elman, J. L. 1986. The TRACE model of speech perception. Cogn Psychol, Vol. 18, 1986, pp. 695-698.

McCoy, S. L., Tun, P. A., Cox, L. C., Colangelo, M., Stewart, R. A. & Wingfield, A. (2005). Hearing loss and perceptual effort: downstream effects on older adults' memory for speech. Quarterly Journal of Experimental Psychology A, Vol. 58, 2005, pp. 22-33.

Miyake A. & Shah P. (1999), Models of Working Memory, Cambridge, UK, Cambridge University Press.

Moore, B. C. J. (1998). A comparison of four methods of implementing automatic gain control (AGC) in hearing aids. British Journal of Audiology, Vol. 22, 1998, pp. 93-104.

Naylor G., Johannesson R. B. & Lunner T. (2006), Fast-acting compressors change the effective signal-to-noise ratio—both upwards and downwards, International Hearing Aid Research Conference (IHCON), Lake Tahoe, Calif., August 2006.

Naylor, G. & Johannesson, R. B. (2009). Long-term Signal-to-Noise Ratio (SNR) at the input and output of amplitude compression systems. Journal of the American Academy of Audiology, Vol. 20, No. 3, 2009, pp. 161-171.

Pascal W. M. Van Gerven, Fred Paas, Jeroen J. G. Van Merriënboer, and Henrik G. Schmidt, Memory load and the cognitive pupillary response in aging, Psychophysiology. Volume 41, Issue 2, Published Online: 17 Dec. 2003, Pages 167-174.

Pichora-Fuller, M. K. (2007). Audition and cognition: What audiologists need to know about listening. In C. Palmer & R. Seewald (eds.) Hearing Care for Adults. Stäfa, Switzerland: Phonak, 2007, pp. 71-85.

Pichora-Fuller, M. K., Schneider, B. A. & Daneman, M. (1995). How young and old adults listen to and remember speech in noise. Journal of the Acoustical Society of America, Vol. 97, 1995, pp. 593-608.

Pichora-Fuller, M. K. (2003). Cognitive aging and auditory information processing. International Journal of Audiology, Vol. 42(Supp 2), 2003, pp. S26-S32.

Plomp, R. (1988). Auditory handicap of hearing impairment and the limited benefit of hearing aids. Journal of the Acoustical Society of America, Vol. 63(2), 1988, pp. 533-549.

Plomp, R. (1994). Noise, amplification, and compression: considerations for three main issues in hearing aid design. Ear and Hearing, Vol. 15, 1994, pp. 2-12.

Rabbitt, P. (1968). Channel-capacity, intelligibility and immediate memory. Quarterly Journal of Experimental Psychology, Vol. 20, 1968, pp. 241-248.

Rabbitt, P. (1990). Mild hearing loss can cause apparent memory failures which increase with age and reduce with IQ. Acta Oto-laryngologica, Vol. 476(Suppl), 1990, pp. 167-176.

Reder, L. M., Nhouyvanisvong, A., Schunn, C. D., Avers, M. S., Angstadt, P., & Hiraki, K. (2000). A mechnistic account of the mirror effect for word frequency: A computational model of remember-know judgments in a continuous recognition paradigm. Journal of Experimental Psychology: Learning, Memory, and Cognition, Vol. 26, 2000, pp. 294-320.

Retrieved from "http://en.wikipedia.org/wiki/CLARION_(cognitive_architecture)"

Ricketts, T. A. (2005). Directional hearing aids: Then and now. Journal of Rehabilitation Research and Development, Vol. 42(4), 2005, pp. 133-144.

Rudner, M., Foo, C., Sundewall-Thorén, E., Lunner T. & Rönnberg, J. (2008). Phonological mismatch and explicit cognitive processing in a sample of 102 hearing aid users. International Journal of Audiology, Vol. 47 (Suppl. 2), 2008, pp. S163-S170.

Rönnberg, J. (1990). Cognitive and communicative function: The effects of chronological age and "handicap age". European Journal of Cognitive Psychology, Vol. 2, 1990, pp. 253-273.

Rönnberg J. (2003). Cognition in the hearing impaired and deaf as a bridge between signal and dialogue: A framework and a model, Int. J. Audiol., Vol. 42, 2003, pp. S68-S76.

Rönnberg, J., Rudner, M., Foo, C. & Lunner, T. (2008), Cognition counts: A working memory system for ease of language understanding (ELU), International Journal of Audiology, Vol. 47 (Suppl. 2), 2008, pp. S171-S177.

Sarampalis, A., Kalluri, S., Edwards, B. & Hafter, E. (2006). Cognitive effects of noise reduction strategies. International Hearing Aid Research Conference (IHCON), Lake Tahoe, Calif., August 2006.

Sarampalis A., Kalluri S., Edwards B., Hafter E. (2008), Understanding speech in noise with hearing loss: measures of effort, International Hearing Aid Research Conference (IHCON), Lake Tahoe, Calif., Aug. 13-17, 2008.

Sarampalis, A., Kalluri, S., Edwards, B. & Hafter, E. (1999). Objective measures of listening effort: Effects of background noise and noise reduction. Journal of Speech, Language, and Hearing Research, Vol. 52, October 2009, pp. 1230-1240.

Schum, D. J., Matthews, L. J. & Lee, F. S. (1991) Actual and predicted word-recognition performance of elderly hearing-impaired listeners. Journal of Speech Hearing Research, Vol. 34, 1991, pp. 636-642.

Schum, D. J. (2003). Noise-reduction circuitry in hearing aids: (2) Goals and current strategies. The Hearing Journal. Vol. 56(6), 2003, pp. 32-40.

Shinn-Cunningham, B. G. (2008a). Object-based auditory and visual attention. Trends in Cognitive Sciences, Vol. 12(5), 2008, pp. 182-186.

Shinn-Cunningham BG (2008b). Auditory object formation, selective attention, and hearing impairment. International Hearing Aid Research Conference (IHCON), Lake Tahoe, Calif., August 13-17, 2008.

Stewart, T. C. and West, R. L. (2005) Python ACT-R: A New Implementation and a New Syntax. 12th Annual ACT-R Workshop Sun, R. (2002). Duality of the Mind: A Bottom-up Approach Toward Cognition. Mahwah, N.J.: Lawrence Erlbaum Associates.

Sun, R. (2003). A Tutorial on CLARION 5.0. Technical Report, Cognitive Science Department, Rensselaer Polytechnic Institute.

Sun, R., Merrill, E., & Peterson, T. (2001). From implicit skills to explicit knowledge: A bottom-up model of skill learning. Cognitive Science, 25, 203-244. http://www.cogsci.rpi.edu/~rsun/

Sun, R., Slusarz, P., & Terry, C. (2005). The interaction of the explicit and the implicit in skill learning: A dual-process approach. Psychological Review, Vol. 112, 2005, pp. 159-192. http://www.cogscispi.edu/~rsun/

Sun, R. & Zhang, X. (2006). Accounting for a variety of reasoning data within a cognitive architecture. Journal of Experimental and Theoretical Artificial Intelligence, Vol. 18, 2006, pp. 169-191.

Tun, P. A. & Wingfield, A. (1999). One voice too many: adult age differences in language processing with different types of distracting sounds. Journals of Gerontology Series B: Psychological Sciences and Social Sciences, Vol. 54(5), 1999, pp. 317-327.

US 2002/028991 (MEDTRONIC) Mar. 7, 2002

U.S. Pat. No. 6,574,513 (BRAINMASTER TECHNOLOGIES) Jun. 3, 2003 van Boxtel, M. P., van Beijsterveldt, C. E., Houx, P. J., Anteunis, L. J., Metsemakers, J. F. & Jolles, J. (2000). Mild hearing impairment can reduce verbal memory performance in a healthy adult population. Journal of Clinical Experimental Neuropsychology, Vol. 22, 2000, pp. 147-154.

van den Bogaert, T., Doclo, S., Wouters, J. & Moonen, M. (2008). The effect of multimicrophone noise reduction systems on sound source localization by users of binaural hearing aids. Journal Acoustical Society of America, Vol. 124(1), 2008, pp. 484-97.

Wang, D. L. (2005). On ideal binary mask as the computational goal of auditory scene analysis. In P. Divenyi (Ed.), Speech separation by humans and machines (pp. 181-197). Norwell, M A: Kluwer Academic, 2005.

Wang, D. L. (2008). Time-Frequency Masking for Speech Separation and Its Potential for Hearing Aid Design. Trends in Amplification, Vol. 12, 2008, pp. 332-353.

Wang D. L., Kjems U., Pedersen M. S., Boldt J. B. & Lunner T. 2009. Speech Intelligibility in Background Noise with Ideal Binary Time-frequency Masking, Journal of the Acoustical Society of America, Vol. 125, No. 4, April 2009, pp. 2336-2347.

Wingfield, A. & Tun, P. A. (2001). Spoken language comprehension in older adults: Interactions between sensory and cognitive change in normal aging. Seminars in Hearing, Vol. 22 (3), 2001, pp. 287-301.

Wolpaw J. R., Birbaumer N., McFarland D. J., Pfurtscheller G. & Vaughan T. M. (2002), Brain-computer interfaces for communication and control, Clinical Neurophysiology, Vol. 113, 2002, pp. 767-791.

Kenneth P. Wright Jr., Joseph T. Hull, and Charles A. Czeisler (2002), Relationship between alertness, performance, and body temperature in humans, Am. J. Physiol. Regul. Integr. Comp. Physiol., Vol. 283, Aug. 15, 2002, pp. R1370-R1377.

Zekveld, A. A., Deijen, J. B., Goverts, S. T. & Kramer, S. E. (2007). The relationship between nonverbal cognitive functions and hearing loss. Journal of Speech and Language Hearing Research, Vol. 50, 2007, pp. 74-82.

The invention claimed is:

1. A hearing aid system for obtaining an ambulatory electroencephalogram, EEG, comprising two hearing instruments and two or more electric terminals in the surface of a hearing instrument shell of the hearing instruments where the shell contacts the skin inside or outside the ear canal of a user; the hearing instruments comprising: an input transducer for converting an input sound to en electric input signal, a signal processing unit for processing the input signal based on the obtained EEG to provide an input signal according to a user's needs and providing a processed output signal, and an output transducer for converting the processed output signal to an output sound, the two hearing instruments adapted to communicate EEG signals by wireless transmission of the EEG signal from one of the two hearing instruments in one ear of the user to the other of the two hearing instruments in the other ear of the user.

2. A hearing aid system according to claim 1, wherein one of the electric terminals is a reference electrode.

3. A hearing aid system according to claim 1, comprising an in the ear, ITE, part of the hearing instrument, the ITE part being adapted for being located fully or partially in the ear canal of the user and wherein the ITE part comprises two electric terminals located on or extending from the surface of the ITE part.

4. A hearing aid system according to claim 3, wherein the ITE part comprises a mould adapted to a particular user's ear canal.

5. A hearing aid system according to claim 1, comprising a behind the ear, BTE, part of a hearing instrument, where the BTE part is adapted for being located behind the ear of a user.

6. A hearing aid system according to claim 5, wherein the BTE part comprises four electric terminals, two of which are located on a face of the BTE part, which is adapted for being supported by the ridge where the ear is attached to the skull, and two of which are located on a face of the BTE part adapted for being supported by the skull.

7. A hearing aid system according to claim 1, wherein the electric terminals are specifically adapted for picking up electric signals from the user related to a direct measure of cognitive load of the user.

8. A hearing aid system according to claim 1, wherein the electrical terminals all serve the same purpose.

9. A hearing aid system according to claim 1, wherein the electrical terminals all serve different purposes.

10. A hearing aid system according to claim 1, wherein the electric terminal comprises an electronic circuit for picking up a relatively low voltage from a body and for transmitting a value representative of the voltage to the signal processor of the hearing instrument.

11. A hearing aid system according to claim 1, comprising at least one additional electric terminal located in a symmetry plane of a head of the user as defined by a nose of the user, ears being located symmetrically about the plane, said least one additional electric terminal constituting a reference terminal.

12. A hearing aid system according to claim 1, comprising a correction-unit specifically adapted for attenuating or removing artifacts from the EEG-signal.

13. A hearing aid system according to claim 1, comprising a body-mounted device having two extra electric terminals mounted in electrical contact with body tissue.

14. A hearing aid system according to claim 13, wherein the body-mounted device comprises amplification and processing circuitry to allow a processing of the signals picked up by the electric terminals.

15. A hearing aid system according to claim 13, wherein the body-mounted device and at least one of the hearing instruments each comprise a wireless interface comprising corresponding transceivers and antennas for establishing a wireless link therebetween for use in the exchange of data between the body-mounted device and the hearing instrument(s).

16. A hearing aid system according to claim 15, wherein the wireless link is based on near-field or far-field electromagnetic fields.

* * * * *